US008787926B2

(12) United States Patent
Mody

(10) Patent No.: US 8,787,926 B2
(45) Date of Patent: Jul. 22, 2014

(54) METHOD AND SYSTEM FOR THE SPECTRUM MANAGER OPERATION IN COGNITIVE RADIO SYSTEMS

(75) Inventor: Apurva N. Mody, Chelmsford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 295 days.

(21) Appl. No.: 13/375,380

(22) PCT Filed: Mar. 30, 2011

(86) PCT No.: PCT/US2011/030454
§ 371 (c)(1),
(2), (4) Date: Nov. 30, 2011

(87) PCT Pub. No.: WO2011/123501
PCT Pub. Date: Oct. 6, 2011

(65) Prior Publication Data
US 2012/0071189 A1    Mar. 22, 2012

Related U.S. Application Data

(60) Provisional application No. 61/319,053, filed on Mar. 30, 2010.

(51) Int. Cl.
*H04W 72/08* (2009.01)
(52) U.S. Cl.
USPC ............... 455/452.2; 455/509; 455/67.11; 455/512

(58) Field of Classification Search
USPC ........... 455/509, 513, 515, 67.11, 450, 452.1, 455/62, 422.1, 434, 464, 512, 452.2; 370/328, 252, 311
See application file for complete search history.

(56) References Cited

U.S. PATENT DOCUMENTS

| 7,372,890 B2 | 5/2008 | Batra et al. |
| 8,208,391 B2 * | 6/2012 | Gurney et al. ................. 370/252 |
| 2009/0280748 A1 * | 11/2009 | Shan et al. ................. 455/67.11 |
| 2010/0008297 A1 * | 1/2010 | Kim et al. ..................... 370/328 |
| 2010/0075704 A1 | 3/2010 | McHenry et al. |

* cited by examiner

*Primary Examiner* — John J Lee
(74) *Attorney, Agent, or Firm* — Sand & Sebolt; Joseph A. Sebolt; Daniel J. Long

(57) ABSTRACT

A system and method for the operation of a Spectrum Manager (SM) within a cognitive radio system includes two primary states of operation: SM at network initialization and SM at network operation. While in the network Initialization state, the SM's primary responsibility is to find an operating channel. After an operating channel is found, the SM moves from the network initialization state to the network operation state while executing a procedure to establish a network. While in the network operation state, the SM can execute other procedures, a procedure to update list of available channel from the incumbent database of channel and frequency data, a procedure to determine a signal type, a procedure to enter co-existence mode, deciding when to move to a backup channel and issuing calls for the same as well as background procedures such as looking for better backup channels when the SM is otherwise idle.

21 Claims, 25 Drawing Sheets

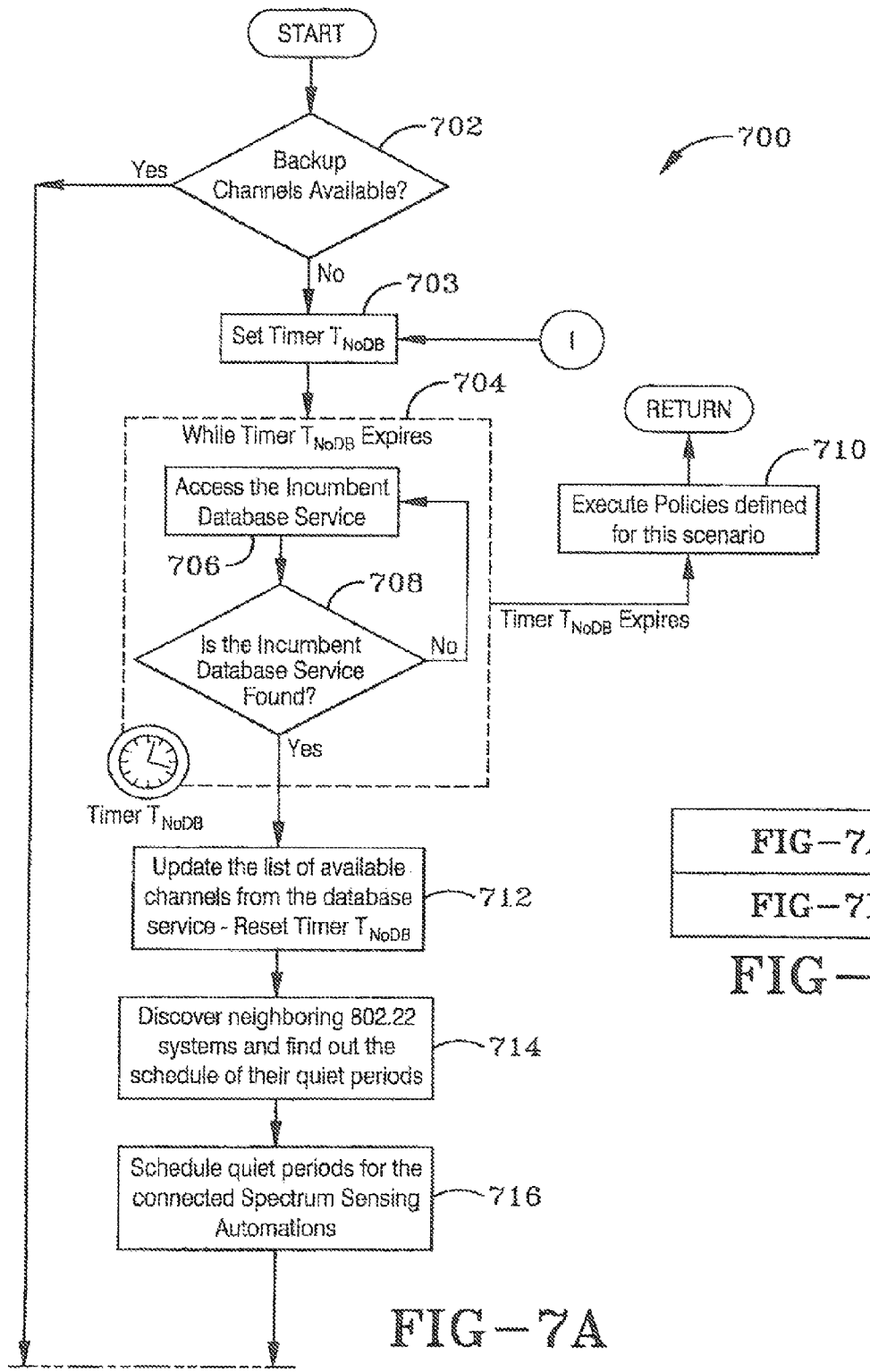

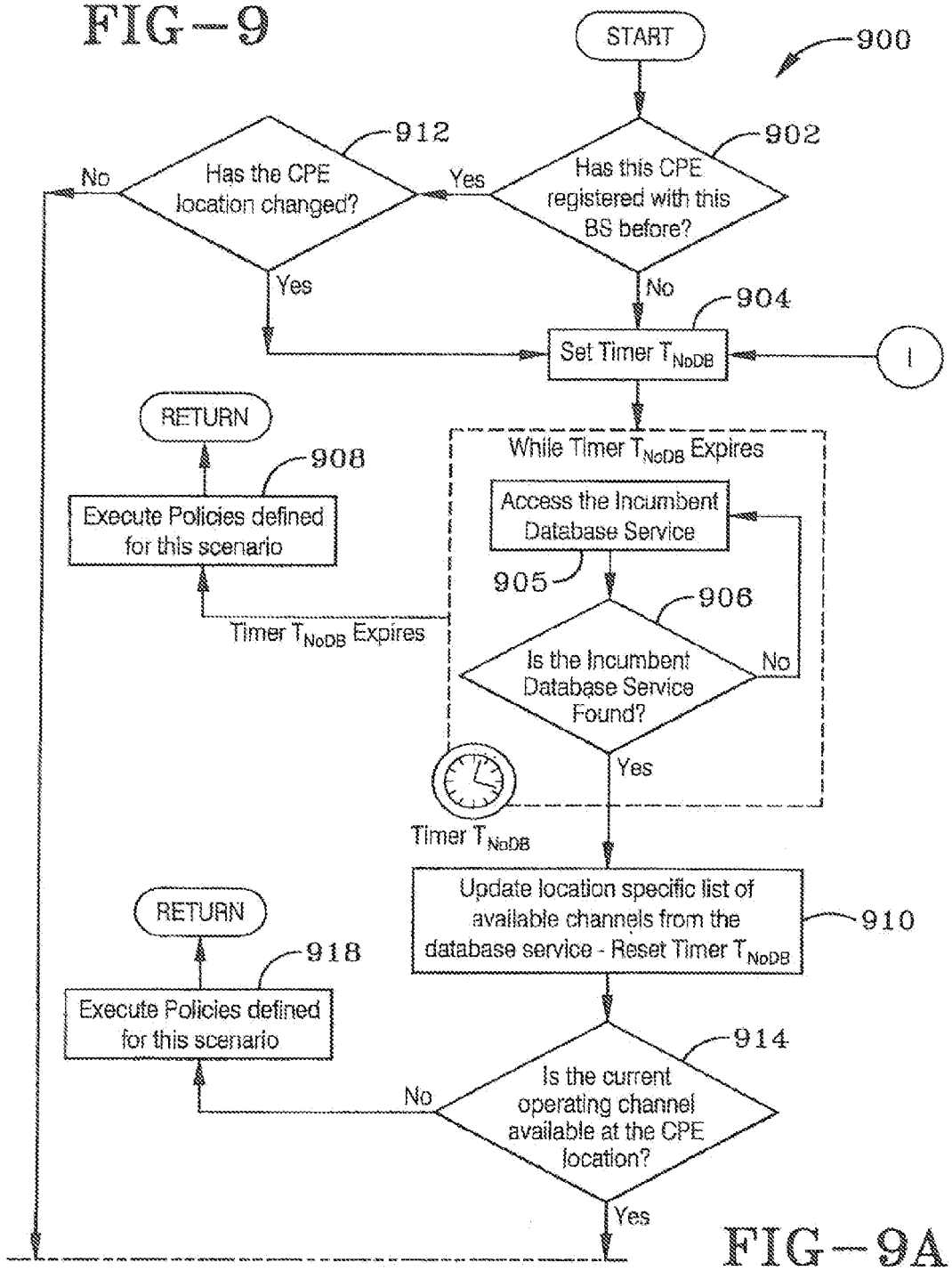

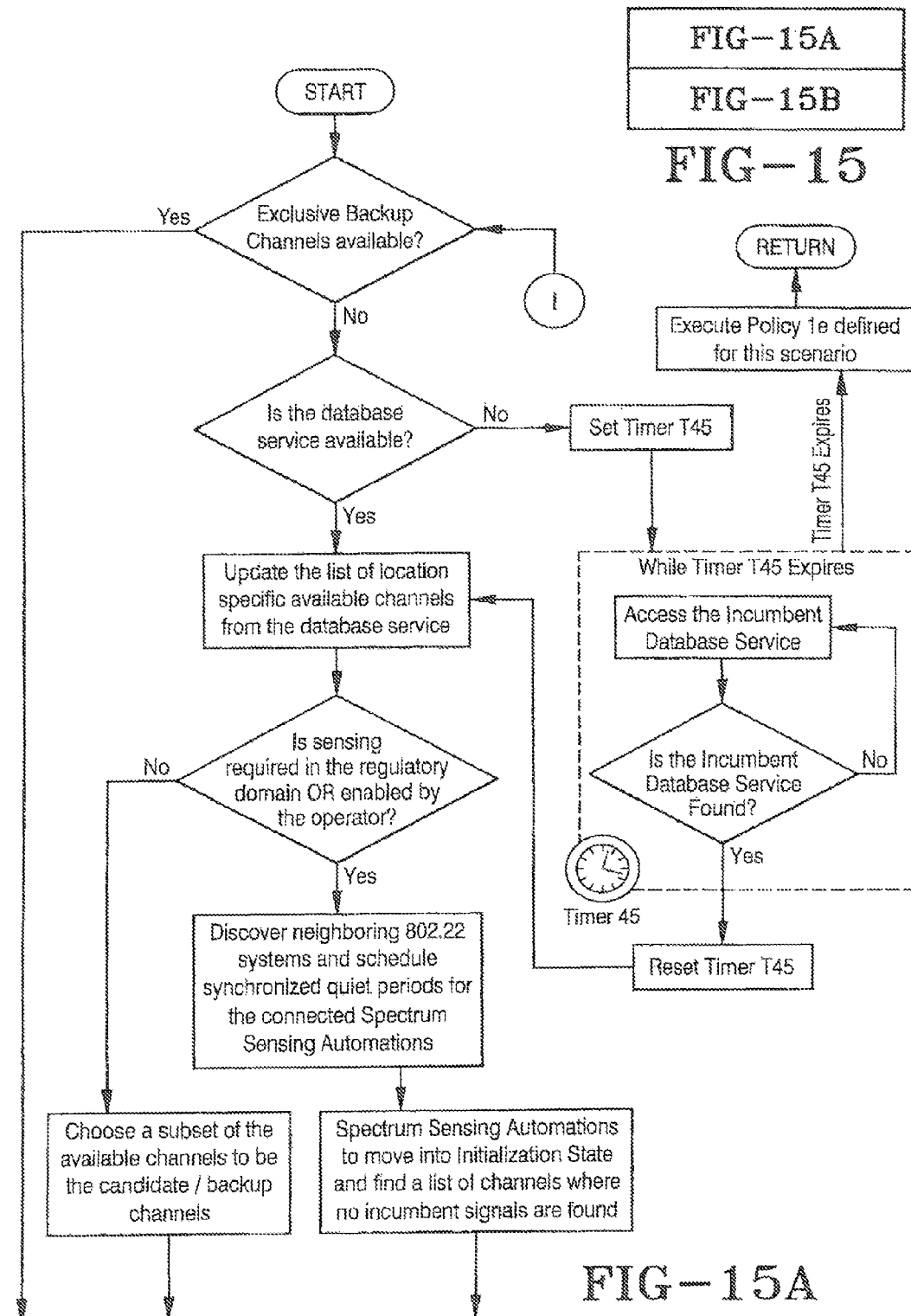

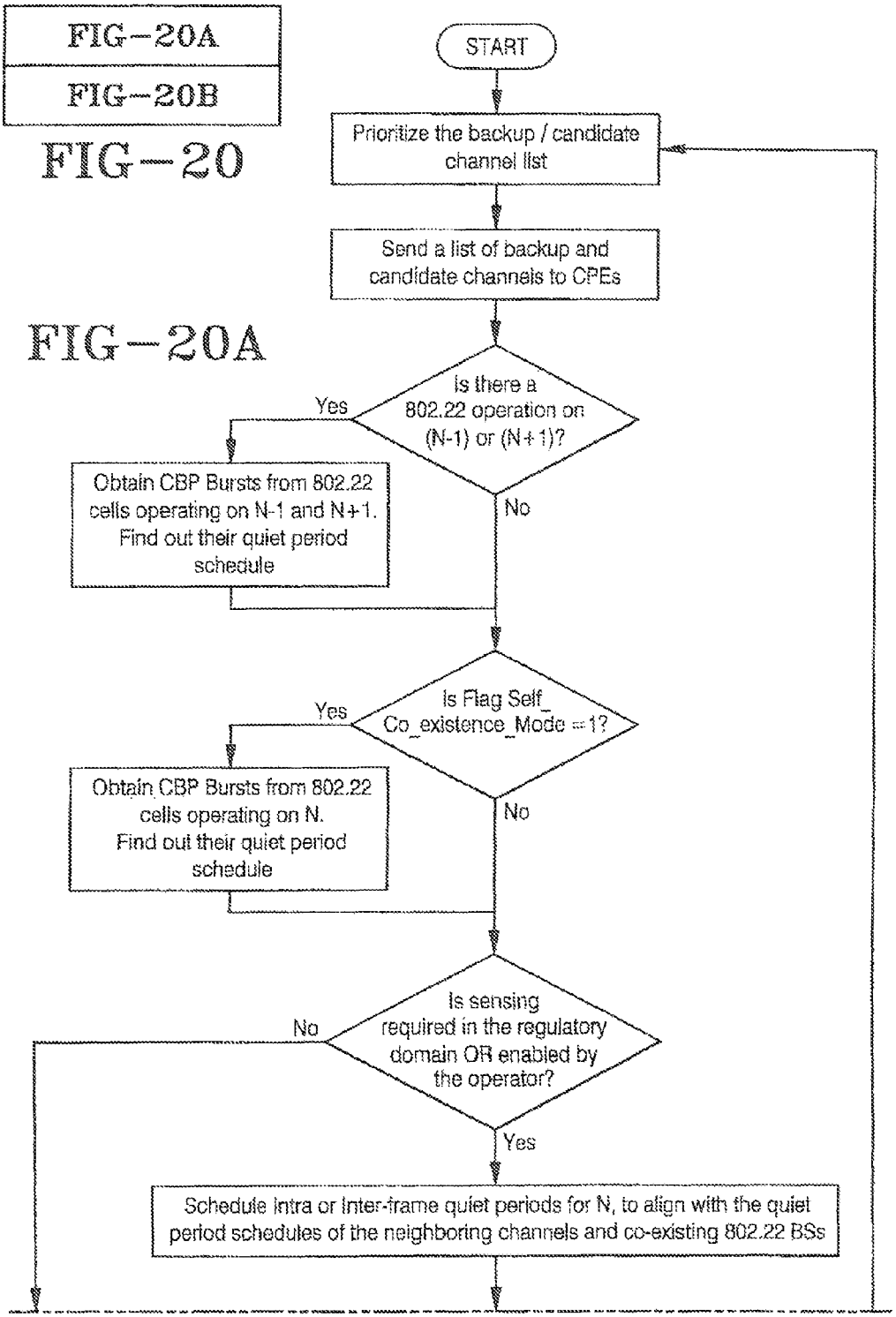

METHOD AND SYSTEM FOR THE SPECTRUM MANAGER OPERATION IN COGNITIVE RADIO SYSTEMS

BACKGROUND OF THE INVENTION

1. Field of Invention

The current invention relates generally to apparatus, systems and methods for wireless communication. More particularly, the apparatus, systems and methods relate to protecting wireless communication networks from dynamic interference. Specifically, the apparatus, systems and methods enable communications in the un-used spectrum also referred to as White Spaces while interfacing with various entities such as sensing, policies, database, etc. in the network and meeting the regulatory requirements.

2. Description of Related Art

Conventional commercial wireless communications networks are vulnerable to dynamic interference environment. Interference may affect a variety of communications systems. Today's wireless networks also need to protect the incumbent systems which may already be operating on the given frequency bands. Hence, they need to detect the presence of these legitimate incumbent systems and vacate the spectrum if required. Previous wireless networks often do not have the intelligence to autonomously move to other un-occupied frequency bands or alter their bandwidth. Large amounts of resources have already been invested by many commercial operators in building these radio systems which are currently not dynamic spectrum access (DSA) enabled. In order to make the current radios cognitive, it will require more investment from the commercial carriers.

In more detail, it is generally believed that there is ample radio frequency (RF) spectrum available to meet the global demand for voice, video and data. For instance, based on measurements of the average spectrum usage in multiple different markets, it has been found that more than 80% of the available spectrum is under-utilized. Most of the current spectrum has been allocated using a command and control licensing structure where a few selected entities are in charge of large swaths of spectrum, many of which are under-utilized. The most relevant example is that of broadcast television (TV) spectrum where signals are normally transmitted over the air at VHF and UHF frequencies. In rural markets, TV channels often go unused due to limited demand. In urban markets, the majority of people have started receiving their TV transmission either using cable or optical fiber. Many countries are making a transition towards Digital TV (DTV) where signals occupy much smaller bandwidths as compared to their analog counterparts. These factors lead to large and increasing amounts of spectrum that are allocated to broadcast services but are locally unused. This vacant spectrum may be opportunistically accessed to transmit broadband data in case it can be established that such a use causes no harmful interference to the allocated (incumbent) broadcast services.

Technology already exists to allow opportunistic usage of RF spectrum. Such opportunistic use of spectrum is often called dynamic spectrum access (DSA). Programs such as the neXt Generation (XG) Communications have proven that DSA techniques can allow access to channels allocated to incumbent users without harmful interference to the incumbent. The concept of cognitive radio also seems to be feasible. Cognitive radios are defined as radios that are capable of sensing their surrounding environment and altering their transmission parameters to more optimally utilize the existing resources, such as RF spectrum, to meet current user needs. Some have even proposed combining DSA techniques with machine learning techniques to make better usage of the system resources while avoiding interference.

The future points to multitudes of such DSA enabled cognitive radio devices using a variety of different waveforms and protocols, co-existing, in cognitive networks to make the best possible use of the available spectrum. The word co-existence here is of importance since competing technologies will result in different types of waveforms and protocols being employed for various types of services. These diverse waveforms and protocols will need to share spectral resources without harming each other, hence, the need for co-existence. Some of the Institute of Electrical and Electronics Engineers (IEEE) standards working groups such as IEEE 802.15.2 have defined the term co-existence as the "ability of one system to perform a task in a given shared environment where other systems have an ability to perform their tasks and may or may not be using the same set of rules."

The IEEE 802.22 standard is directed to wireless regional area networks (WRANs) that use white spaces (unused bandwidth) in the television broadcasting bands without interfering with other users. The standard is largely based on concepts underpinning the cognitive radio.

The P1900.1 Standard defined the term Cognitive Radio as:

A. A type of Radio in which communication systems are aware of their environment and internal state and can make decisions about their radio operating behavior based on that information and predefined objectives.

B. Cognitive Radio (as defined in A) that utilizes radio, adaptive radio, and other technologies to automatically adjust its behavior or operations to achieve desired objectives.

Cognitive radios generally include spectrum sensing, access to an incumbent or primary user database, geo-location of the users, subscriber registration and tracking, spectrum management as well as spectrum mobility and sharing. Spectrum management generally involves reasoning and decision making for utilization of the best part of the spectrum to meet user quality of service (QoS) requirements and using it without harmful interference to other users. Spectrum mobility and sharing allow for maintaining seamless communications when transitioning from one part of the spectrum to another (e.g., dynamic spectrum access, dynamic frequency selection, frequency hopping, etc.), and strive for fairness in spectrum allocation.

To this end, cognitive radios and networks sharing common bandwidth have to effectively self-coexist with one another and also ensure that no harmful interference is caused to the primary users or the incumbents by accessing different parts of the available spectrum in a fairly distributed manner. Executing such self-coexistence and spectrum management is not trivial. Moreover, conventional co-existence techniques require changes in the concept of communication system operation, thereby resulting in legacy systems not being interoperable with systems requiring co-existence.

Behind the learning, reasoning and decision-making process lays an entity that embodies the intelligence of a cognitive radio network. This entity is responsible for interfacing with many different awareness processes in the cognitive radio network such as spectrum sensing, interface to the incumbent or primary user database, geo-location of various users or subscribers, subscriber registration and tracking, channel set management, co-existence, scheduling quiet periods, interface to the regulatory domain dependent policies, etc. This entity is referred to using many different names such as 'Cognitive Engine', 'Spectrum Manager (SM)', 'System Strategy Reasoner (SSR)', etc. The IEEE 802.22 Standard refers to this entity as the Spectrum Manager (SM). The SM may reside in a single node in a network, or it can be distributed across the network resulting in distributed decision-making. In certain cases, when such an entity resides in a single node in the network, that node may be called a Control Node or a Base Station (BS). For example, in the IEEE 802.22 system, the SM resides at the BS and is logically connected to Spectrum Sensing Automatons (SSAs), incumbent database service, policies, geo-location devices, etc. over a wireless connection, a wired connection, a fiber optic connection, or a combination thereof. Spectrum Sensing Automatons are the driver programs attached to the Spectrum Sensing Functions (SSF) in a Cognitive Radio network. It is envisioned that each radio with a SSF will also have a SSA. Even though current radios have some cognitive abilities, better radios are still desired.

SUMMARY OF THE INVENTION

The preferred embodiment includes a cognitive radio system with a spectrum manager (SM). The preferred embodiment includes a method for the operation of a spectrum manager SM that includes two primary states of operation: SM at network initialization and SM at network operation. While in the network initialization state, the SM's primary responsibility is to find an operating channel. After an operating channel is found, the SM moves from the network initialization state to the network operation state while executing a procedure to establish a network. While in the network operation state, the SM can execute other procedures, including a procedure to verify new consumer premise equipment (CPE), a procedure to update databases of channel and frequency data, a procedure to determine a signal type when a new signal is detected, a procedure to enter co-existence mode when a co-existence situation is encountered, as well as background procedures such as looking for better backup channels when the SM is otherwise idle.

In other configurations, the method of operating a spectrum manager includes, while in the network initialization state, determining if an operating channel is available. When an operating channel is available, spectrum sensing etiquette is used to choose an operating channel and a network is established in a normal mode of operation. A list of candidate channels, operating channels and backup channels can also be updated when the operating channel is available. When an operating channel is not found, a search for an exclusive backup channel is made. When an exclusive backup channel is not found, a determination is made if the network may operate in a self co-existence mode, and if it can, the SM initiates placing the cognitive radio network into a self co-existence mode.

The method of operating a spectrum manager can access an incumbent database service when an operating channel is not found. Next a determination is made if an incumbent database service is found. Spectrum sensing is performed to convert candidate to backup channels when an incumbent database service is found.

In other configurations of the method, a timer can additionally be set before the accessing of an incumbent database service. If the timer expires and the connection to the database service cannot be established, then the SM may decide to execute a corresponding policy based on the regulatory domain requirements. For example, in the United States, if the SM cannot connect to an incumbent database service within a specified time period, it is required to cease all wireless transmissions until such a connection is restored. The spectrum sensing is then performed to convert the candidate channel to the new backup channel before the timer expires. Additionally, a list of available channels from the incumbent database service is updated and the timer is reset.

In some configurations of the preferred embodiment, when an incumbent database service is found, one or more actions may be performed that include updating a list of available channels from the incumbent database service, discovering neighboring cognitive radio systems, discovering schedules of neighboring cognitive radio system quiet periods, scheduling quiet periods for connected spectrum sensing automatons, instructing connected spectrum sensing automations to move into an initialization state and to find a list of candidate channels that are a subset of available channels, and spectrum sensing to convert a candidate to a backup channel.

In other configurations of the preferred embodiment, while in the network initialization state, a determination can be made if an operating channel is available. When an operating channel is not available a determination is made if an incumbent database service can be found. When an incumbent database service is found, a determination is made if one or more exclusive backup channels are found. When one or more exclusive backup channels are found, spectrum sensing etiquette is used to choose an operating channel. The operating channel is then used to establish a network in a normal mode of operation.

The method of operating the spectrum manager can determine if a consumer premise equipment (CPE) has registered with a base station (BS) associated with the spectrum manager before. When the CPE has registered with the BS, a determination can be made to determine if the location of the CPE has changed. When the location has not changed, the CPE is permitted to register with the cognitive radio network. Additionally, when the CPE has registered with the BS or the location of the CPE has changed, a search for an incumbent database service is performed. When an incumbent database service is found, a location-specific list of available channels from the database service can be updated and a verification that the CPE security suite, as well as the CPE spectrum sensing specifications of the CPE, is performed to determine if they are supported by the SM and the network. When the CPE security suite and the CPE spectrum sensing specifications are supported, the CPE is allowed to register with the cognitive wireless network, otherwise it is not allowed to register.

In other configurations, the method of operating a spectrum manager includes steps to update channel databases. When a refresh database timer expires, the refresh database timer is reset, and an attempt is made to access an incumbent database service. When an incumbent database service is found, a location specific list of available channels is updated from the incumbent database service. Next, a determination can be made if the operating channel is available for a base station associated with the spectrum manager and associated CPEs. When the operating channel is available, a list of candidate channels, backup channels and operating channels is updated based on the incumbent database service.

The method of operating a spectrum manager can also detect an incumbent and try to classify its signal. When an incumbent signal is detected and attempt is made to determine its signal type. Cognitive radio policies can be established based, at least in part, on the signal type.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIGS. 7, 7A and 7B illustrate one example embodiment of a flow diagram of procedure "find_operating_channel".

FIGS. 9, 9A and 9B illustrate one example embodiment of a flow diagram of procedure "SM_new_CPE_verification".

Similar numbers refer to similar parts throughout the drawings.

DETAILED DESCRIPTION

Before introducing the details of the preferred embodiment of the invention, an introduction to the Electrical and Electronic Engineers Institute (IEEE) 802.22 standard is presented. This standard is associated with wireless regional area networks (WRAN) that employ cognitive radios (CGs) to which the preferred embodiment of the invention is associated with.

Figure 1:
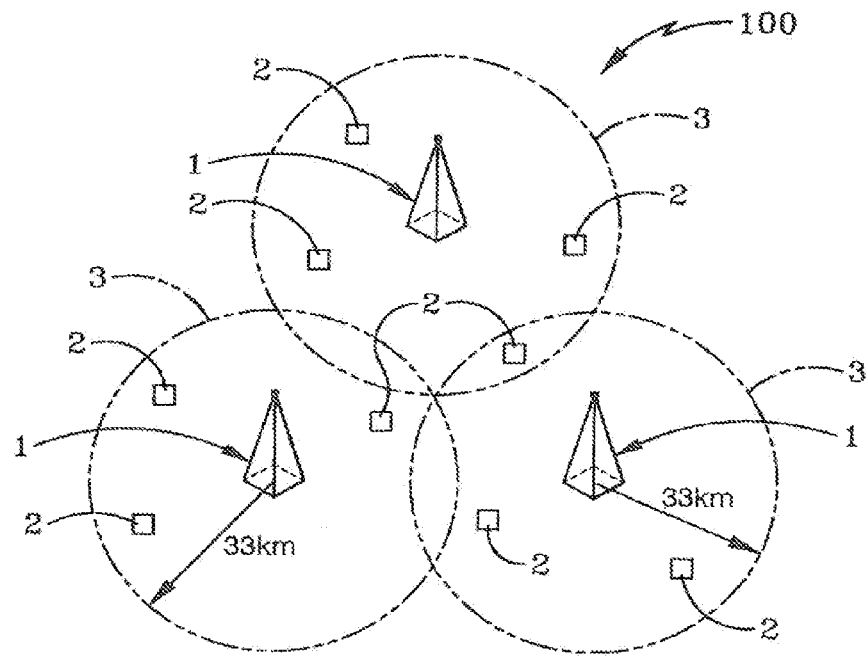
FIG. 1 illustrates an example embodiment of a wireless regional area network (WRAN) implemented with cognitive radios (CRs).

The 802.22 system 100 specifies a fixed point-to-multipoint (P-MP) wireless air interface whereby a base station (BS) 1 manages its own cell 3 and associated consumer premise equipments (CPEs) 2, as illustrated in FIG. 1. In a commercial environment, the BS 1 is a professionally installed entity such as a cellular tower. The BSs 1 and CPEs 2 form a master-slave type of relationship with the BSs 1 controlling the medium access in their cells by transmitting in a downstream direction to the various CPEs 2. The CPEs 2 can freely transmit within a cell after given authorization to do so by its BS 1. An 802.22 cell 3 (or simply, a cell) is generally defined as being formed by a single 802.22 BS 1 and zero or more 802.22 CPEs 2 associated with and under control by this 802.22 BS 1, whose coverage area extends up to the point where the transmitted signal from the 802.22 BS 1 can be received by associated 802.22 CPEs 2 with a given minimum signal to noise ratio (SNR) of signal quality.

In addition to the traditional role of a BS 1, an 802.22 system contains an entity called the Spectrum Manager (SM) that also manages several unique features such as distributed sensing, access to incumbent database service, regulatory domain specific policies, channel set management, channel move or spectrum mobility, incumbent protection, self coexistence, resource allocation, quiet period scheduling, etc. For example, a distributed sensing feature is needed to ensure proper incumbent protection and is managed by the BS 1, which instructs the various CPEs 2 to perform distributed measurement of different communication channels to determine if and when the channels are busy. Based on the feedback received, the BS 1 decides which steps, if any, are to be taken. The SM is also responsible for providing the geo-locations of various subscribers to the incumbent database service along with their transmit antenna heights and their transmitted powers. In turn, the incumbent database service determines the list of available channels for that particular 802.22 WRAN system and provides it to the SM at the BS.

The SM is responsible for ensuring that no harmful interference is experienced by the primary users of the spectrum. To that end, the SM continuously provides information to the incumbent database service, refreshes the list of available channels from the database service, selects a particular available channel to be an operating channel, reserves other available channels as backup or candidate channels, tracks the subscriber locations and ensures that the subscriber is allowed to operate at its current location on that particular channel. It is also responsible for scheduling quiet periods for spectrum sensing in regulatory domains that require spectrum sensing. The SM is responsible for collecting the sensing information from various subscribers/sensors and determining if a primary or incumbent user is found on that channel. In certain cases, the SM also performs cognitive security functions such as determining the signal type (e.g., signal classification) and authenticating the signal to ensure that this was not a false alarm or Denial of Service attack. The SM determines if more sensing measurements are required from one or more sensors where signal was detected and it schedules additional quiet periods. Based on the collected information from the database, spectrum sensing, etc., and the regulatory domain specific policies, the SM determines if channel moves to a backup channel is required for one or more subscribers or the entire network. The SM is responsible for issuing calls for channel move to a backup channel, or transitioning the cognitive radio network into co-existence mode or ensuring that the network shuts down so that the primary users or incumbents do not experience any interference.

The SM is also responsible for interfacing with the Network Management System. For example, out of the given set of available channels, the Network Management System may decide to allocate only a subset to the given network.

The SM may also interface with a Network Co-Existence Manager which is responsible for fair time and frequency distribution of available spectrum between disparate sets of networks, all of whom may want to use the given spectrum.

Figure 2:
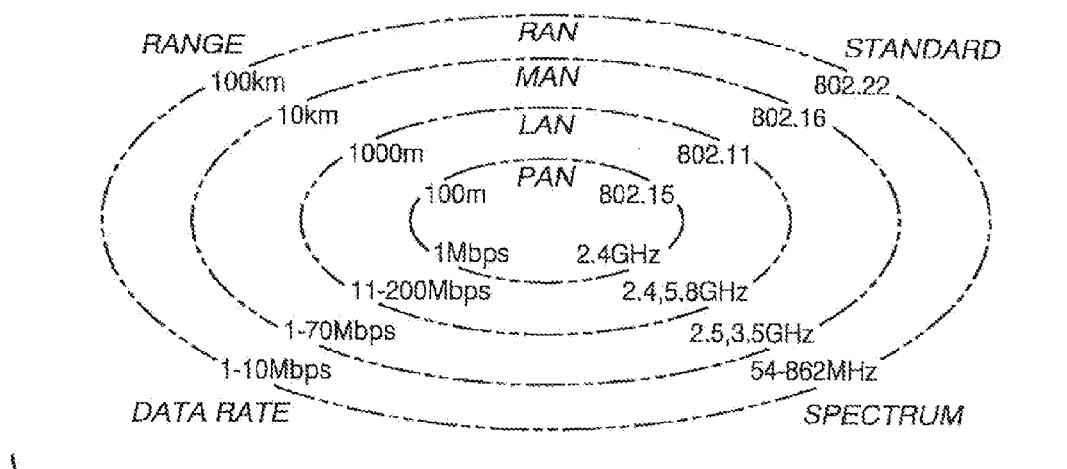
FIG. 2 illustrates characteristics of different wireless network standards.

Another distinctive feature of a 802.22 WRAN as compared to other existing IEEE 802 standards is the BS coverage range, which can go up to 100 Km if power is not an issue (current specified coverage range is 33 Km at 4 Watts Equivalent isotropically radiated power (EIRP)). As shown in FIG. 2, WRANs have a much larger coverage range than traditional networks which is primarily due to its higher power and the favorable propagation characteristics of TV frequency bands. This enhanced coverage range offers unique technical challenges as well as opportunities.

Figure 3:
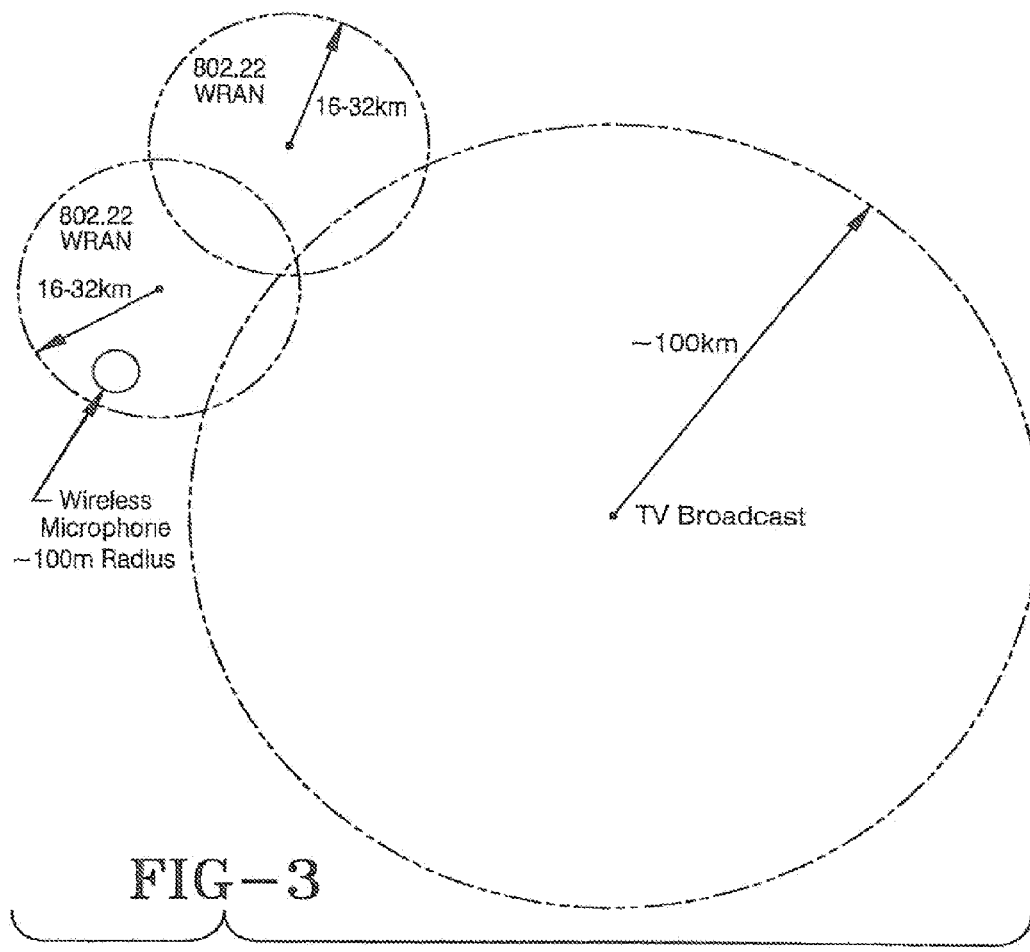
FIG. 3 illustrates IEEE 802.22 compliant radios in coexistence with incumbent radios.

One important requirement for the 802.22 air interface is flexibility and adaptability, which stem from the fact that 802.22 operates in a spectrum where incumbent devices have to be protected. Because an 802.22 system can operate unlicensed and a BS serves a large area, self-coexistence amongst collocated 802.22 cells between the overlapping 802.22 networks as shown in FIG. 1 is of paramount importance as well as the coexistence with incumbents as shown in FIG. 3. The coexistence with the incumbents is achieved by accurate and fast spectrum sensing, measurements, detection algorithms, and spectrum management, which is performed by the CPEs and the BS. So the flexibility with adaptability becomes very high with these techniques. The PHY unit and medium-access controller (MAC) are designed to support this flexibility and adaptability to handle the coexistence issues.

Figure 4:
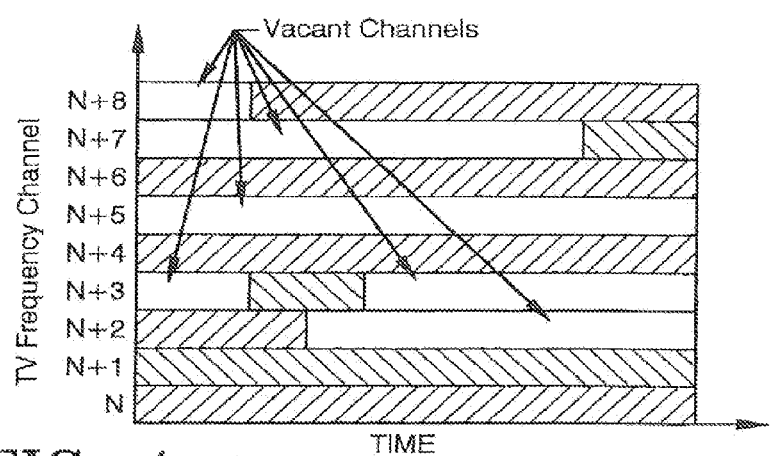
FIG. 4 illustrates an example pattern of channel incumbents with respect to time and frequency.

FIG. 4 illustrates an example pattern of channel occupancy by incumbents with respect to time and frequency. As seen in this Figure, transmission opportunities (i.e., time during which a channel is vacant) by CPEs often experience random behavior which impacts the design of both MAC and PHY. WRAN applications require flexibility on the downstream with support for variable number of users with possibly variable throughput. WRANs also need to support multiple access on the upstream. Multi-carrier modulation techniques such as Orthogonal Frequency Division Multiplexing/Orthogonal Frequency Division Multiple Access (OFDM/OFDMA) are very flexible in this regard, as they enable control of both signal time and frequency domains. This provides an opportunity to define two-dimensional (time and frequency) slots and to map the services to be transmitted in both directions onto a subset of these slots. The current 802.22 draft is based on OFDM/OFDMA modulation for downstream and upstream links with some technological improvements such as channel bonding. WRAN are characterized with generally long delay spreads (25 us and up to 50 us in large terrain or metropolitan areas). This may require the use of a cyclic prefix on the order of 40 us. In order to reduce the impact of the overhead due to cyclic prefix as well as absorb the long delay spreads and any other regulatory requirements imposed by the RF filter Masks, approximately 2K carriers can be used in one channel.

The 802.22 PHY should also provide high flexibility in terms of modulation and coding. For example, consider the scenario in FIG. 1 where CPEs may be located at various distances from the BS and hence experience different Signal-to-Noise Ratio (SNR) quality. To overcome this issue and improve system efficiency, the BS should be capable of dynamically adjusting the bandwidth, modulation and coding on, at least, a per CPE basis. OFDMA is a good fit to meet these targets because it allows efficient allocation of sub carriers to match the requirements of the CPEs. A person of ordinary skill in the art will understand that the subscribers may be divided into 48 subchannels and modulation schemes such as QPSK, 16-QAM, 64 QAM and convolution coding can be used. This provides for a data rate starting from a few Kbps per sub channel up to 19 Mbps per channel which should provide sufficient flexibility.

The Cognitive Radio system may be implemented using a sophisticated Physical Layer transport techniques such as OFDM/OFDMA with mapping done in time and frequency to cause no harmful interference to the incumbents. Or it may use other schemes such as Code Division Multiple Access (CDMA), Direct Sequence Spread Spectrum (DSSS), Single Carrier, Frequency Hopping Spread Spectrum (FHSS), etc. The cognitive radio system may even be implemented such that all the subcarriers are continuously allocated to one Television frequency channel and the system moves to another channel if there is a certain probability of causing interference to the primary or incumbent systems.

The Cognitive Radio system may be implemented using a sophisticated Physical Layer transport techniques such as OFDM/OFDMA with mapping done in time and frequency to cause no harmful interference to the incumbents. It may also use other schemes such as Code Division Multiple Access (CDMA), Direct Sequence Spread Spectrum (DSSS), Single Carrier, Frequency Hopping Spread Spectrum (FHSS), etc. The cognitive radio system may even be implemented such that all the subcarriers are continuously allocated to one Television frequency channel and the system moves to another channel if there is a certain probability of causing interference to the primary or incumbent systems.

It is well known by those of ordinary skill in the art, that wider bandwidth decreases the effect of frequency-selective fading and provides more frequency diversity in a frequency-selective fading channel environment. In addition, wider bandwidth provides more capacity. Thus, whenever spectrum is available, it is beneficial to use wider bandwidth system. Such available wider spectrum can be used to tradeoff data-rate with distance. For example, those devices that are closer to the BS can enjoy high capacity while the ones that are further away can benefit from the multi-path diversity and from more transmitted and received power. The use of channel bonding by aggregating contiguous channels may also be carried out. Channel bonding allows this requirement to be met. There are two channel bonding schemes: bonding of contiguous and non-contiguous channels.

Figure 5:
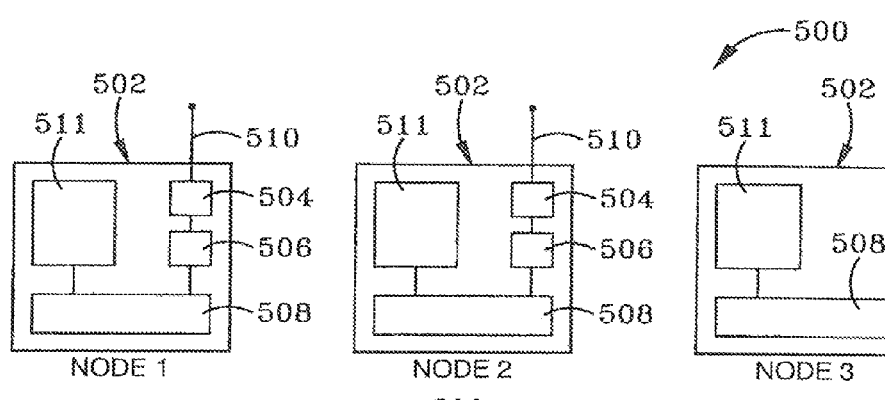
FIG. 5 illustrates a typical 802.22 cognitive radio system.
Figure 5:
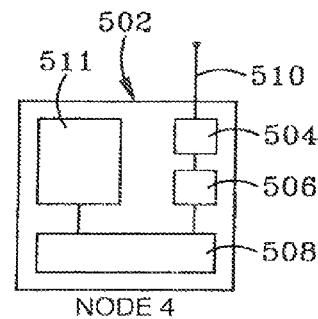

FIG. 5 illustrates a system 500 of radios 502. The radios 502 of this system represent four different nodes 1-4 of a wireless network. The radios 502 forming nodes 1, 2 and 4 of this system 500 contain a non-DSA radio 508 as well as configuration and monitoring (C&M) logic 506 and spectrum sensing logic 504 associated with an antenna 510. The nodes 1-4 may optionally also contain one or more computers 511 (e.g., laptops) connected to the non-cognitive radio 208. The C&M logic 506 is a generic description block and in certain specific cases, this may be referred to as the Spectrum Sensing Automaton (SSA).

"Logic", as used herein, includes but is not limited to hardware, firmware, instructions stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include at least one circuit, one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics The spectrum sensing logic 504 monitors frequency data captured by its antenna 510 and reports which channels and/or frequencies are free or busy to the C&M logic 506. The C&M logic 506 reports this information to one of the nodes 1-4 acting as a Control Node or a Base Station that may contain the spectrum manager (SM). The spectrum sensing logic 504 and the C&M logic 506 can perform other cognitive radio functions such as those described in the 802.22 standards. In FIG. 5, the C&M logic 506 of node 4 may be acting as the SM. In one configuration of the system 500, other nodes 1-3 not acting as the SM report to and are controlled by the SM in a master-slave relationship.

The SM can act as the cognitive engine of the system 500. It monitors the radio link statistics and the spectrum sensing information from each of the nodes 1-3 and makes a decision on whether a change in frequency bandwidth (BW) or power for the radio network is required. The SM may reside in any of the nodes 1-4, since it may have a dedicated IP address associated with it, but in a Point to Multi-Point (PMP) network topology, the SM is likely to reside in the Control Node (CN).

The various operations and procedures executed by the SM can be better understood with reference to state machine and flow diagrams as illustrated in FIGS. 6-13. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 13:
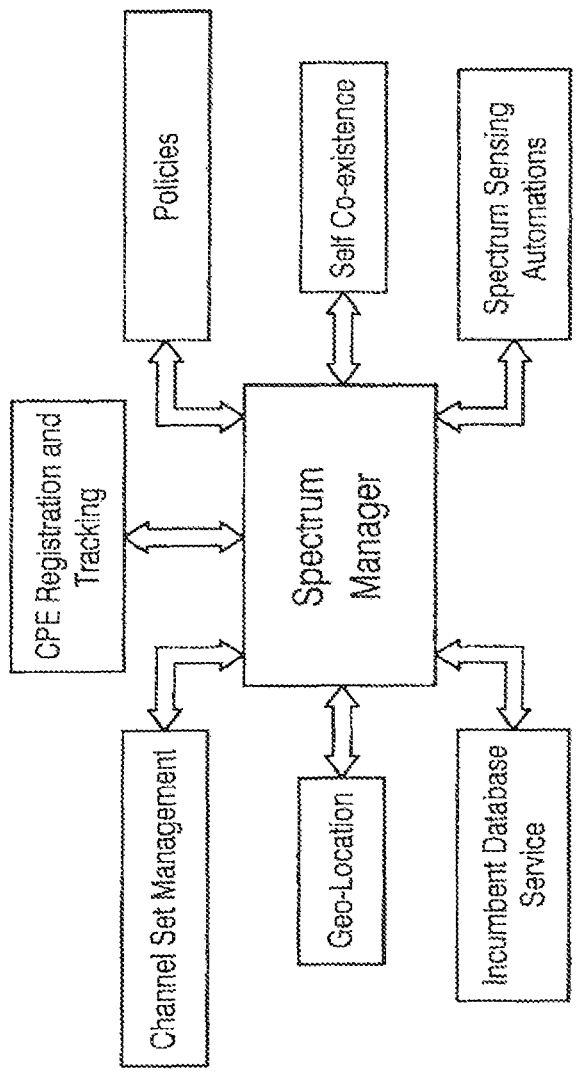
FIG. 13 illustrates how the SM interfaces to various processes in a cognitive radio network.

FIG. 13 illustrates how the SM interfaces with various processes in a cognitive radio network. This figure shows a logical connection between the SM and various processes. In many cases the physical connections may be over the wireless connection or a cable or an optical fiber or the combination there-of. Some of the functions of the Spectrum Manager are as follows:

1. Ensure access to a legitimate incumbent database service
2. Channel Set Management—maintaining the list of available, dis-allowed, candidate, backup, operating channels
3. Interface to the regulatory domain dependent policies as well as policy reasoning (i. e. converting the higher language policy constructs into machine readable codes.)
4. Subscriber geo-location
5. Subscriber registration and tracking
6. Resource allocation and scheduling
7. Interface to the Spectrum Sensing Automatons and Spectrum Sensing Functions
8. Interface to the Network Management System
9. Interface to the Network Co-existence Manager
10. Implementing cognitive security functions such as signal authentication, collaborative sensing, information fusion and decision-making.
11. Scheduling quiet periods
12. Deciding if a channel move is required and which channel to move to, etc.

Figure 14:
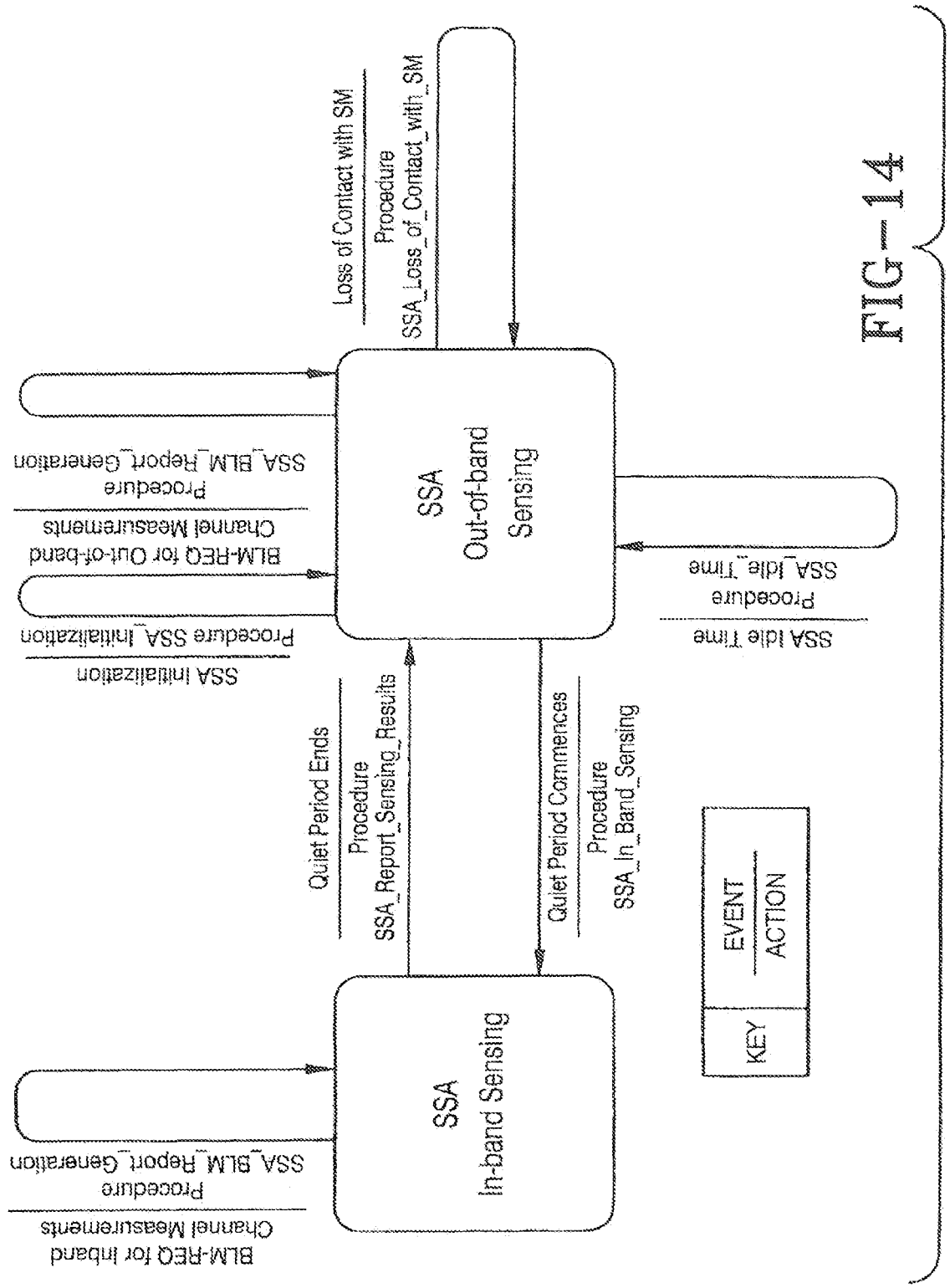
FIG. 14 illustrates a state machine diagram representation for the Spectrum Sensing Automaton (SSA).
Figure 15B:
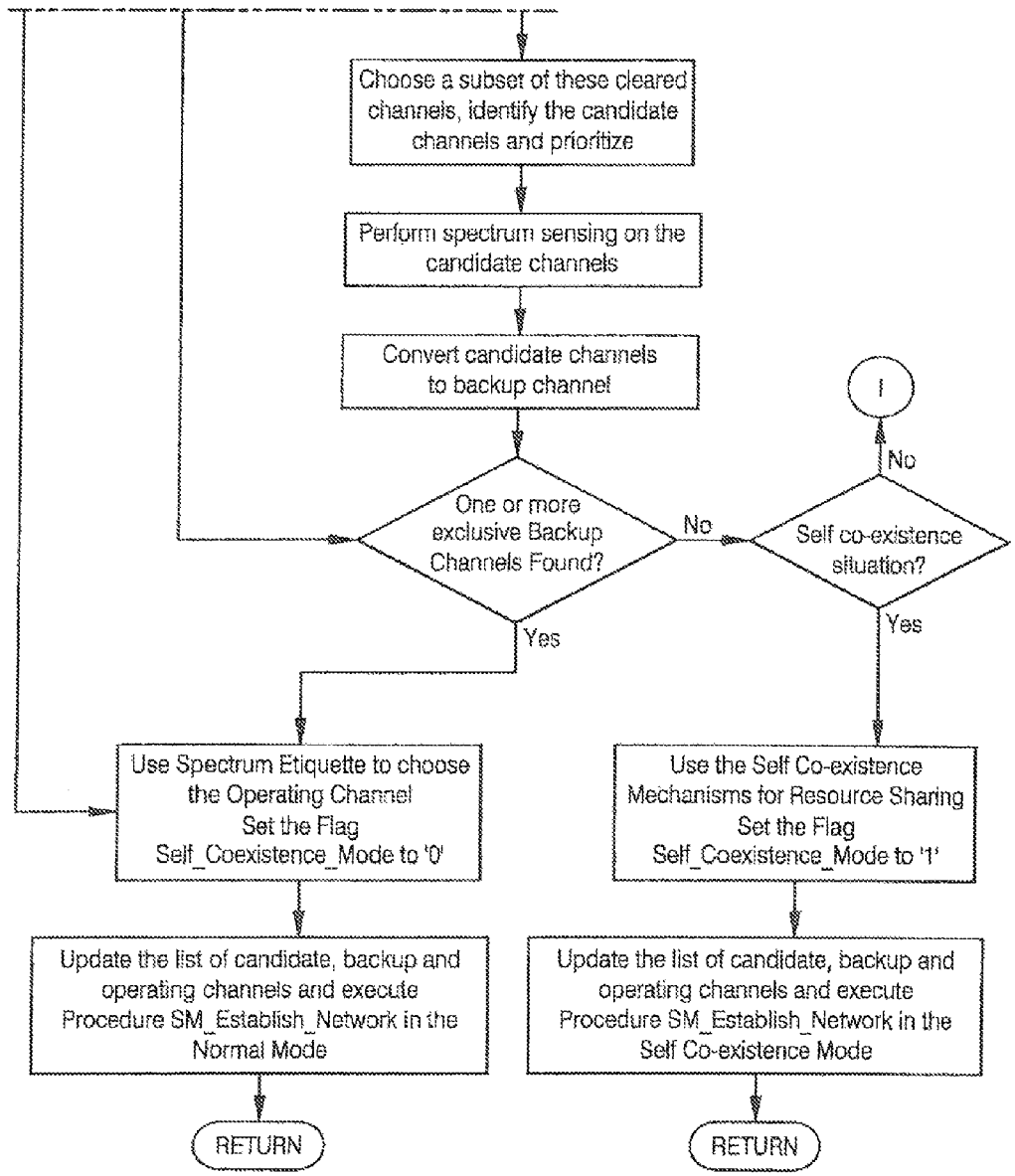
FIG. 15 illustrates another example embodiment of a flow diagram of procedure "find_operating_channel".
Figure 16:
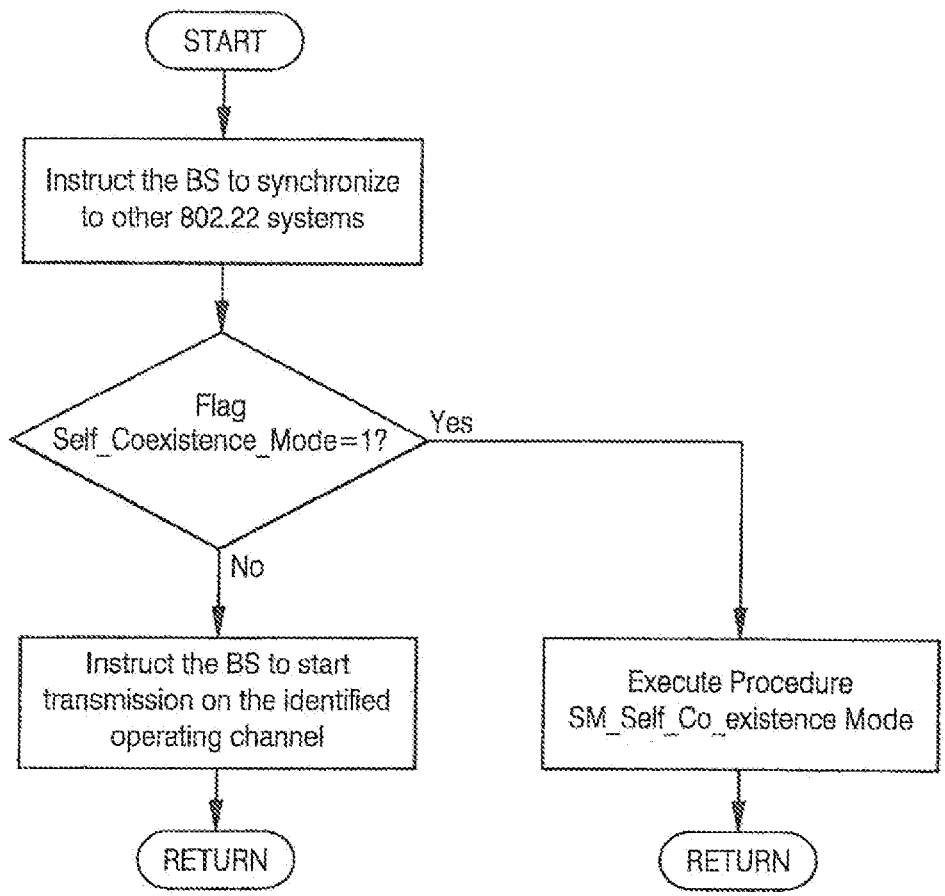
FIG. 16 illustrates another example embodiment of a flow diagram of procedure "SM_establish_network".
Figure 17A:
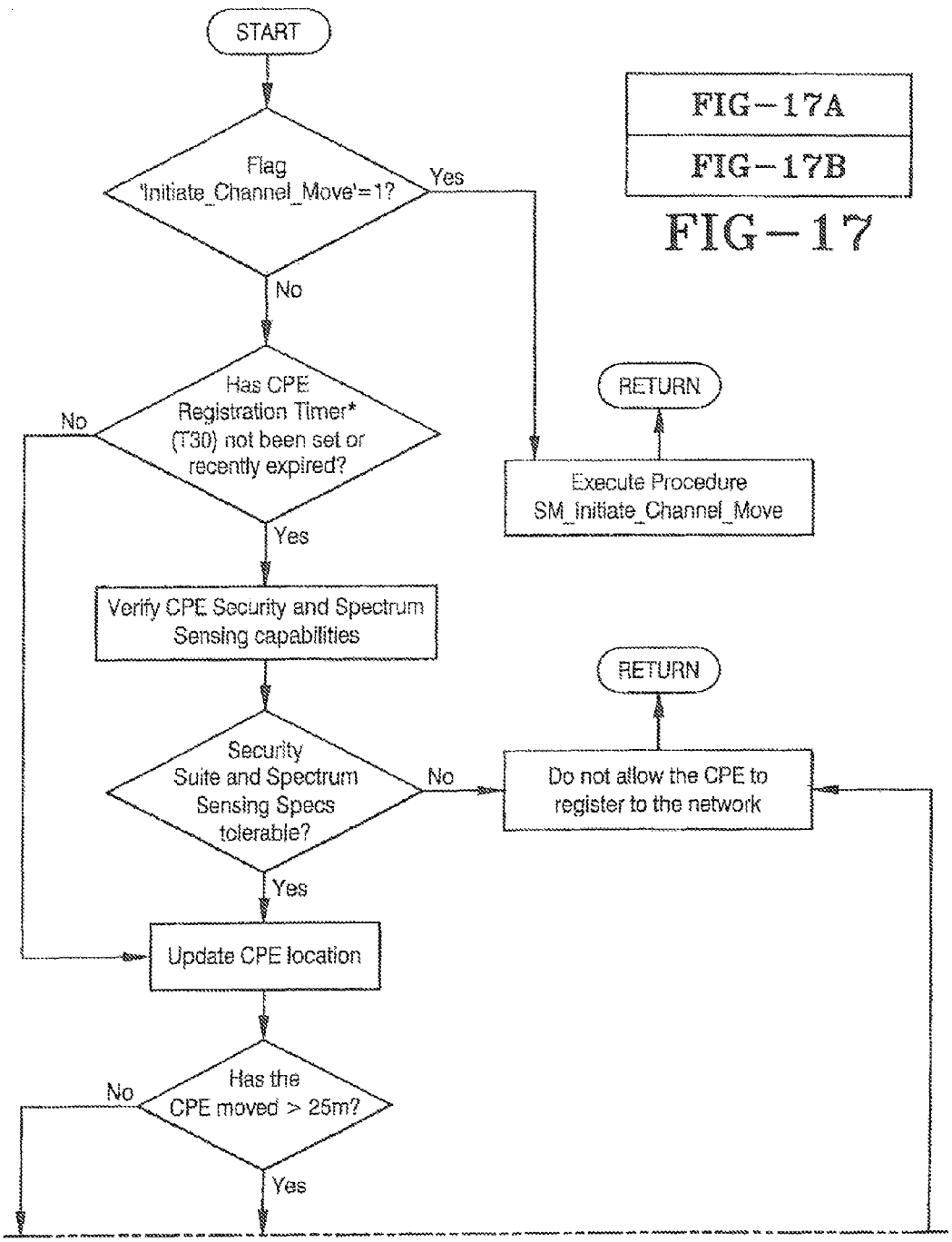
FIG. 17 illustrate an example embodiment of a flow diagram of procedure "SM_CPE_Registration_and_Tracking".
Figure 17B:
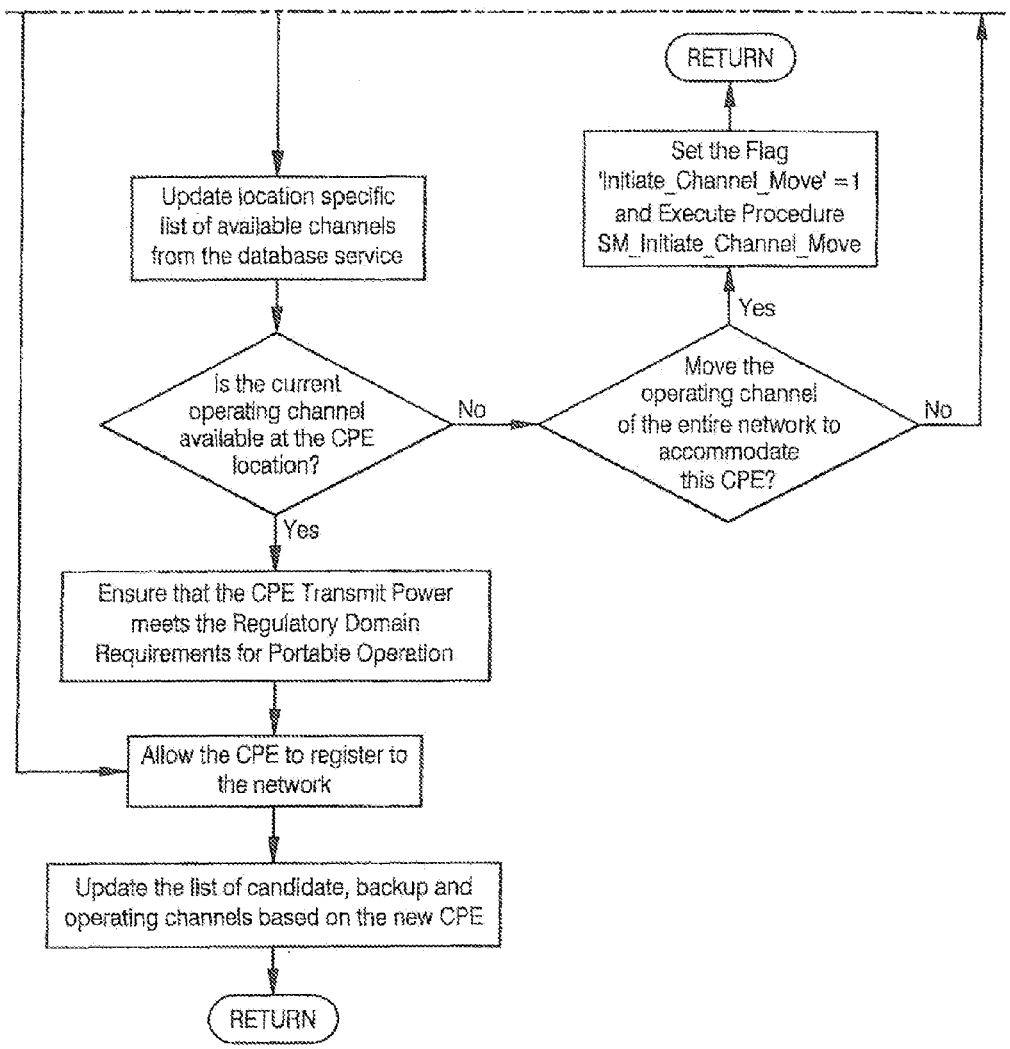
Figure 18:
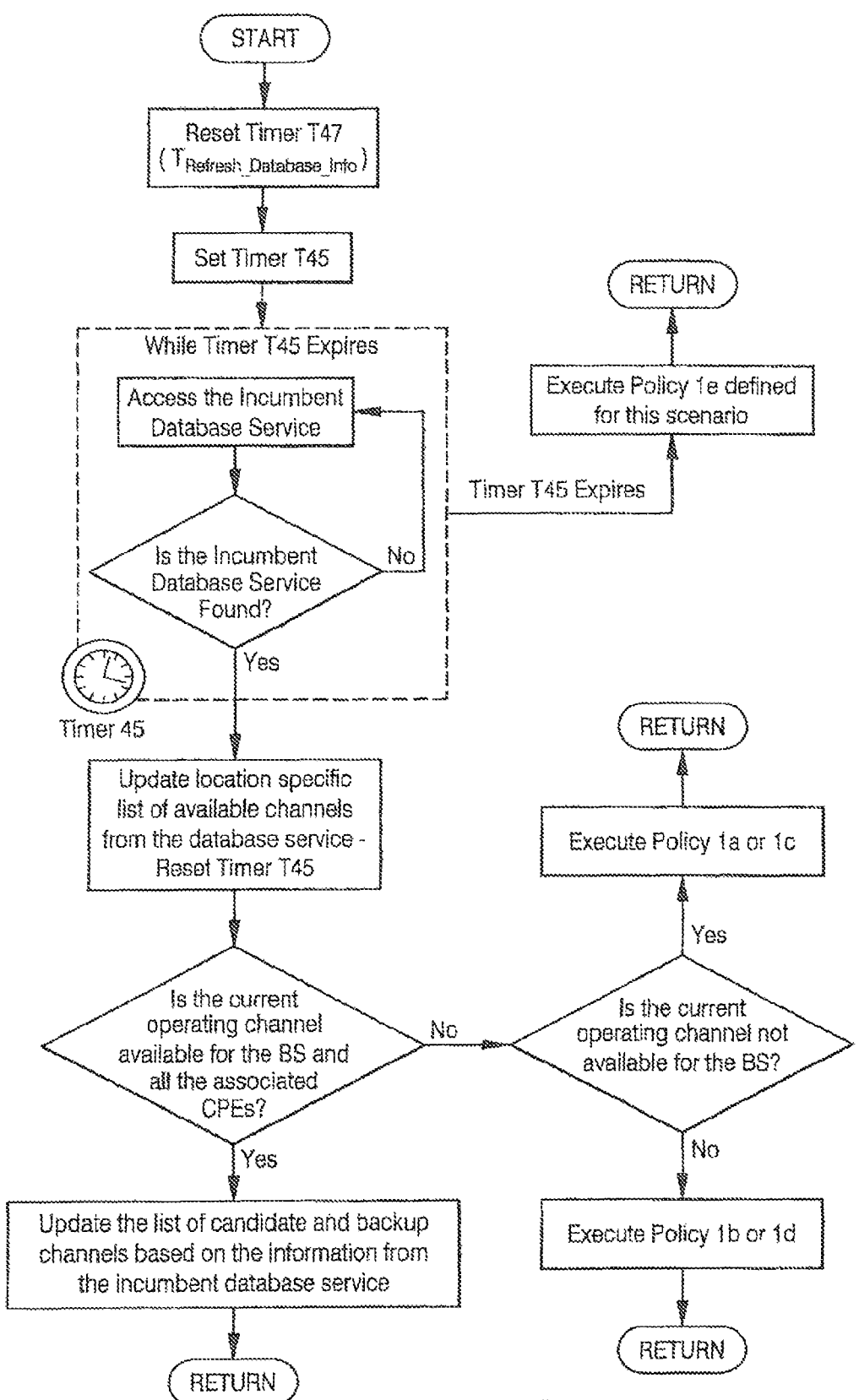
FIG. 18 illustrates another example embodiment of a flow diagram of procedure "SM_database_update".
Figure 19:
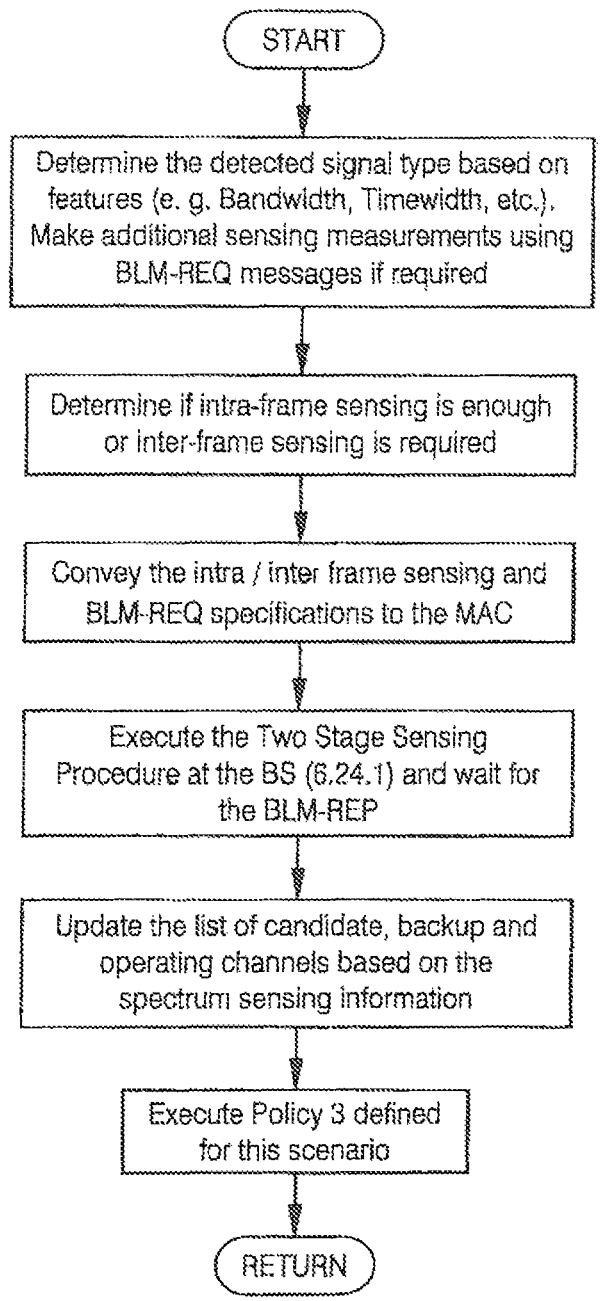
FIG. 19 illustrates one example embodiment of a flow diagram of procedure "SM_Determine_signal_type_execute_policies".
Figure 20B:
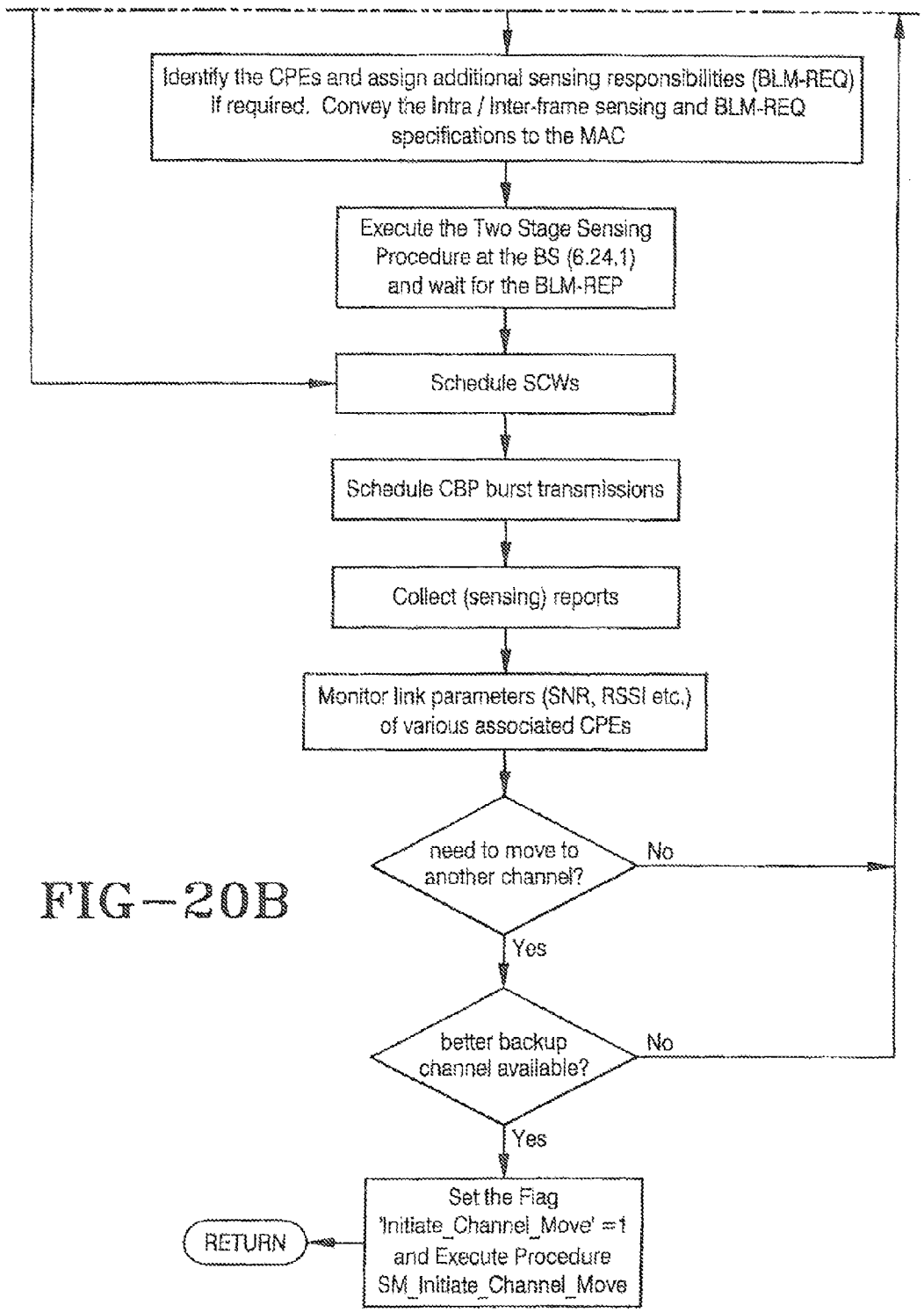
FIG. 20 illustrates another example embodiment of a flow diagram of procedure "SM_background_processes".
Figure 21:
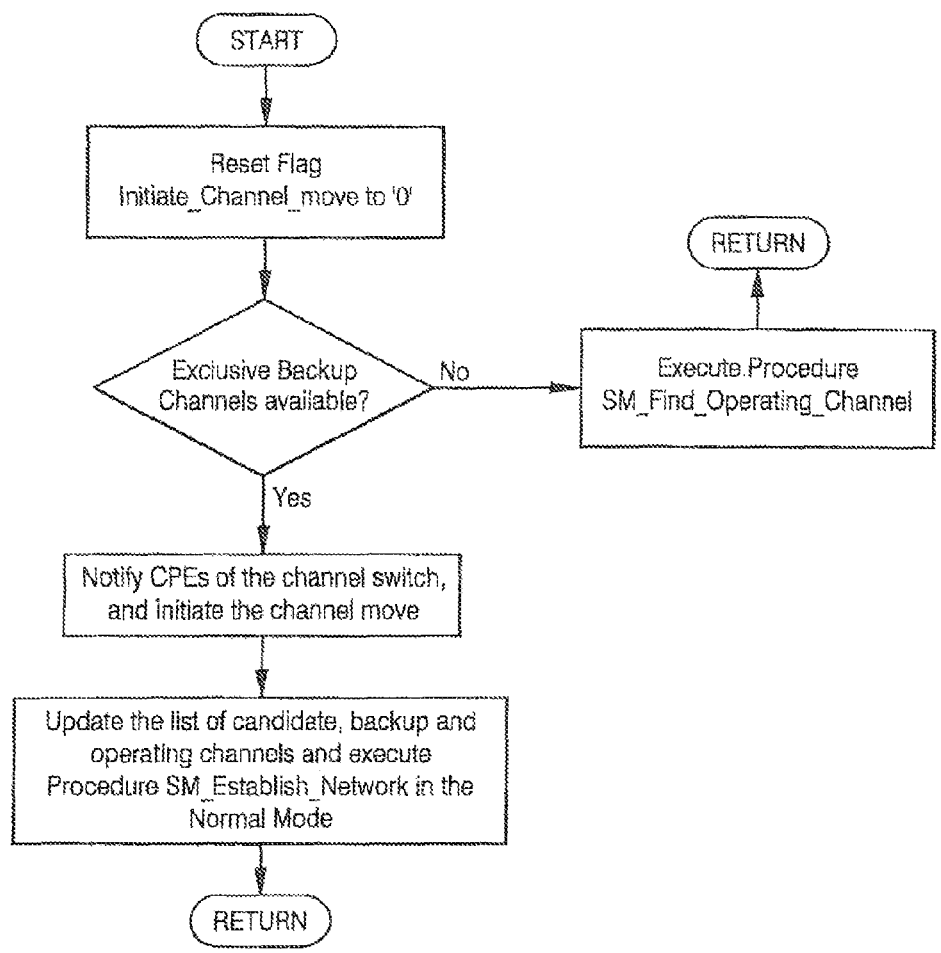
FIG. 21 illustrates one example embodiment of a flow diagram of procedure "SM_Initiate_Channel_Move".
Figure 22:
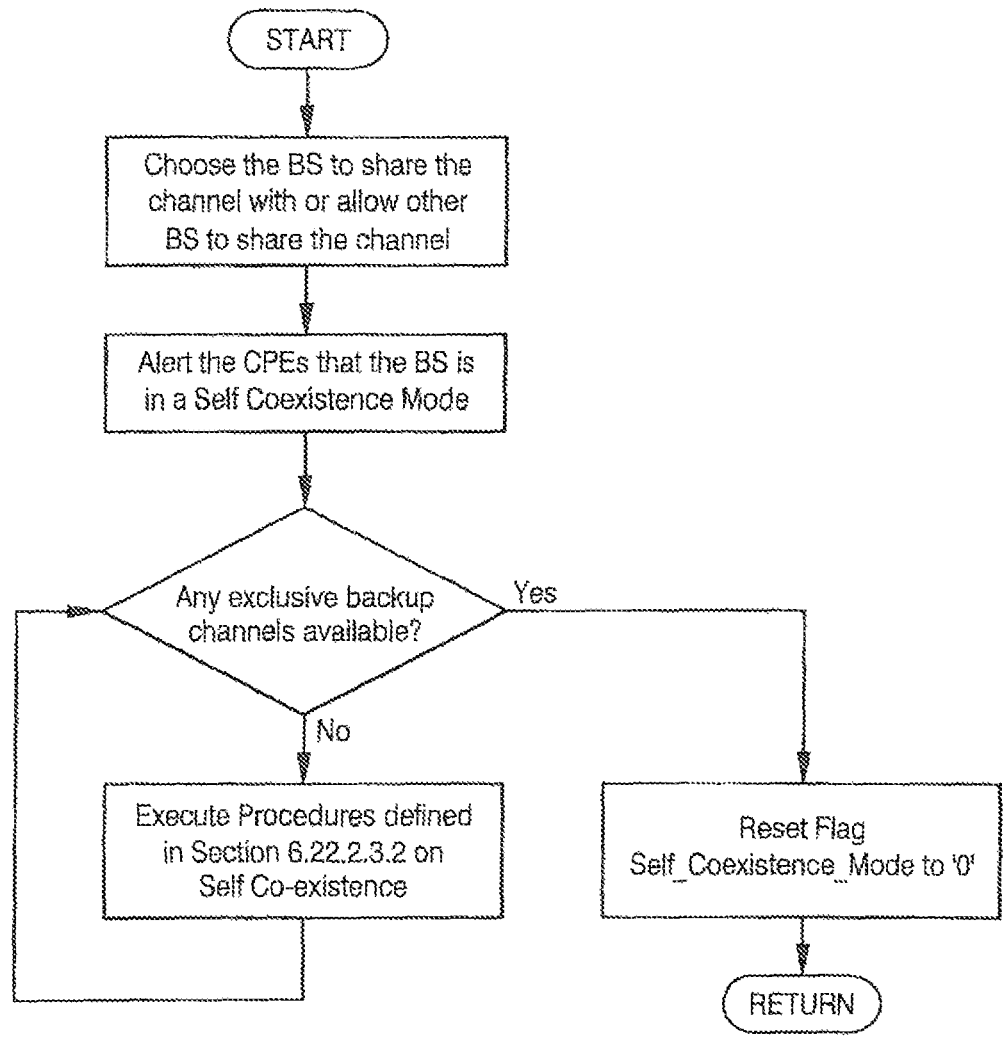
FIG. 22 illustrates one example embodiment of a flow diagram of procedure "SM_Self Coexistence_Mode".

FIG. 14 illustrates a state machine diagram representation for the Spectrum Sensing Automaton. The SM logically interfaces to SSAs that reside in nodes of the IEEE 802.22 Network.

Figure 6:
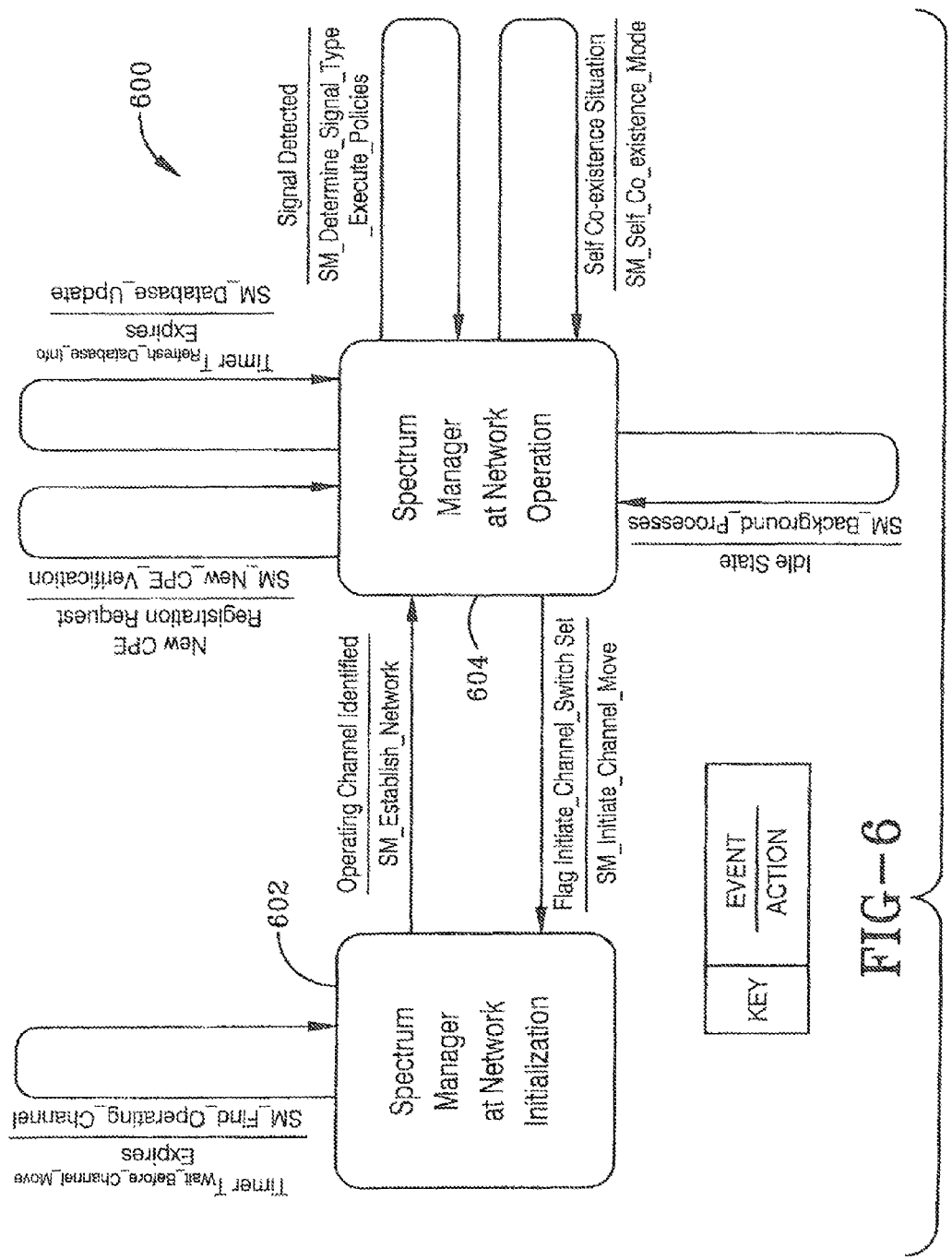
FIG. 6 illustrates one embodiment of a state machine of the SM at network initialization and at network operation.
Figure 7B:
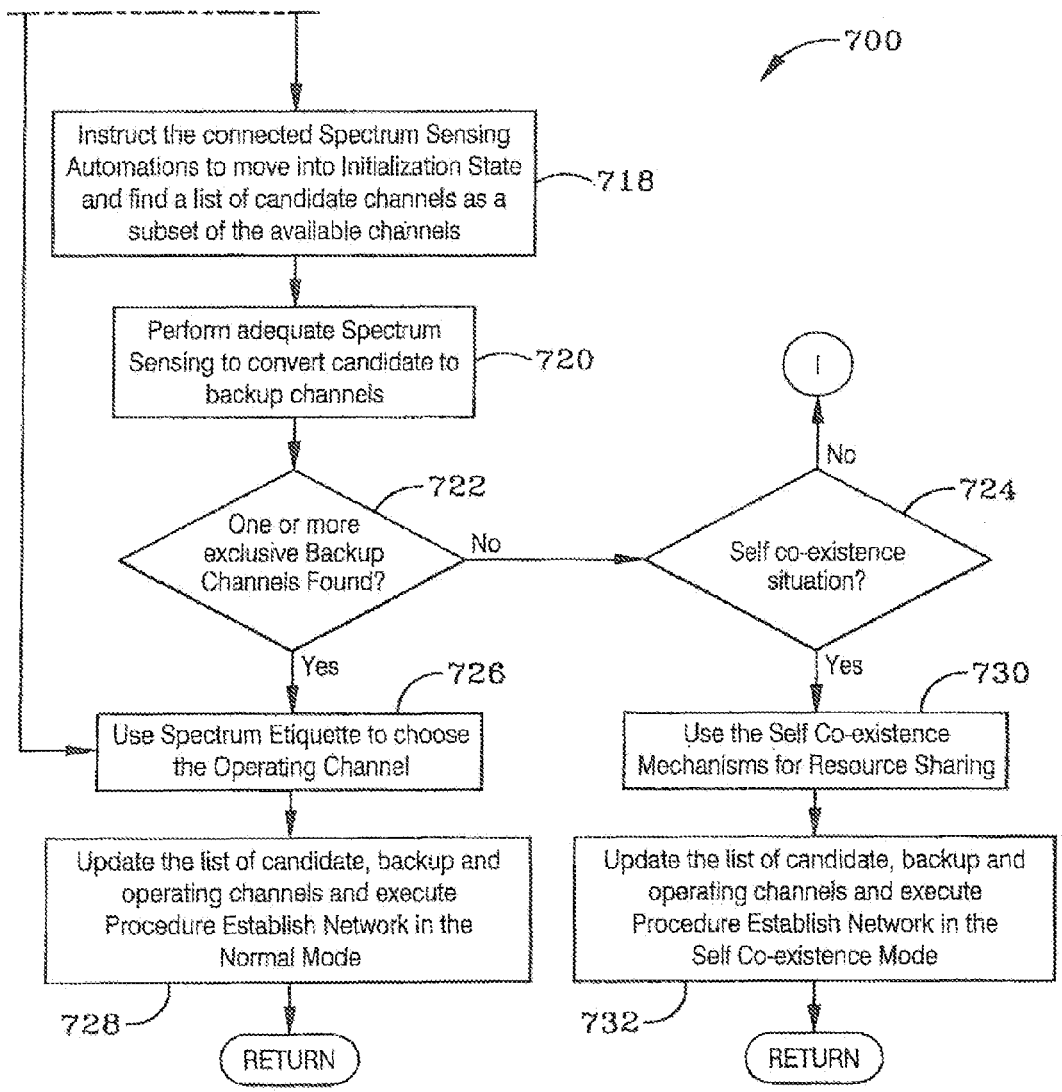

Referring to FIG. 6, an example Spectrum Manager (SM) state machine diagram 600 is illustrated and described. During the Network Initialization state, the primary responsibility of the SM shall be to find the operating channel. The SM state machine has two primary states of operation: SM at Network Initialization 602 and SM at Network Operation 604. The timer ($T_{Wait\_Before\_Channel\_Move}$) in the SM at network initialization shall be set to a default of 10 ms. As described in the 802.22 draft standard, $T_{Wait\_Before\_Channel\_Move}$ is the waiting time before which the BS moves to the first backup channel. This is used to make sure that all the CPEs are ready to move to the backup channel before the BS switches operation to the first backup channel. However, the value of this timer shall be configurable in accordance with the other regulatory domain requirements. During the Network Initialization state, the primary responsibility of the SM shall be to find the operating channel.

Once the Timer $T_{Wait\_Before\_Channel\_Move}$ expires, the SM shall execute the Procedure SM_Find_Operating_Channel. The various tasks involved in order to find an operating channel have been illustrated in FIG. 7. The tasks to find an operating channel shall consist of accessing the incumbent database to obtain a list of available channels, discovering neighboring 802.22 systems, synchronizing as well as scheduling quiet periods, and initiating sensing for the primary user signals.

The SM determines, at 702 if a backup channel is available. If a backup channel is available, the SM can use spectrum etiquette to choose a new operating channel, at 726. The SM can choose the operating channel based on spectrum etiquette as described in Section 10.2.3.2 of the IEEE 802.22 Draft VD3.0 standard (All references to sections herein are to this standard). Next, the SM will update a list of channel candidates, backup and operating channels, and execute Procedure Establish Network, at 728, in the Normal Mode. Procedure Establish Network is discussed further below.

If no backup channels are available, the SM shall set the timer $T_{NoDB}$ at 703. Timer $T_{NoDB}$ indicates the longest time that a WRAN service can operate in the un-licensed band with no access to the database service. The timer values may be initially set to the United States regulatory domain and classes, however, they can be configurable in accordance with other regulatory domain requirements. If the timer $T_{NoDB}$ expires before an incumbent database service is found, then flow of the SM will execute policies defined for that scenario, at 710. For example, the SM can instruct the Base Station to de-register its associated CPEs and to terminate its own operation until the database service becomes available.

Before the $T_{NoDB}$ times out, the SM initially repeatedly accesses an incumbent database service to find a list of available channels as shown by blocks 704 and 708. When an incumbent database service is found, the SM can perform several actions. For example, the SM can update a list of channels from the database service, at 712, and also reset the $T_{NoDB}$ timer, at 712. The SM can discover neighboring 802.22 systems and determining a schedule of their quiet periods, at 714. The SM can then schedule quiet periods for connected Spectrum Sensing Automatons, at 716. The SM then can command the Spectrum Sensing Automatons to go into the Initialization State, at 718, and also find a list of candidate channels as a subset of the available channels. The SM performs adequate spectrum sensing to convert the list of candidate channels to backup channels, at 720. A candidate channel shall become a backup channel and a backup channel shall become an operating channel based on the state transition diagram as specified in Section 10.2.3 of the IEEE 802.22 Draft VD3.0 standard.

The procedure 700 determines if one or more exclusive back channels are found, at 722. If one or more exclusive backup channels are available, the SM chooses an operating channel, at 726, using spectrum etiquette. The spectrum etiquette can be determined as described in Section 6.22.3.1 of the IEEE 802.22 draft VD7.0 standard. The SM then can execute the Procedure Establish the Network, at 728, and move to the SM state machine of FIG. 7 to Spectrum Manager at Network Operation state and set the Timer $T_{Refresh\_Database\_Info}$ to a default value of about one hour. The value of this timer shall be configurable in accordance with the other regulatory domain requirements as needed.

When no exclusive backup channels are found at block 722, the SM determines if self co-existence mode shall be entered, at 724. When co-existence mode is available, the SM uses the self co-existence mechanisms for resource sharing, at 730. The SM also updates the list of candidate backup and operating channels and executes Procedure Establish Network in the Co-existence Mode, at 732. The self co-existence mechanisms have been described in Section 6.22.3 of the IEEE 802.22 draft VD7.0 standard. When no co-existence mode is available, the SM returns to block 703 and sets timer $T_{NoDB}$ before beginning to re-access the incumbent database service.

Figure 8:
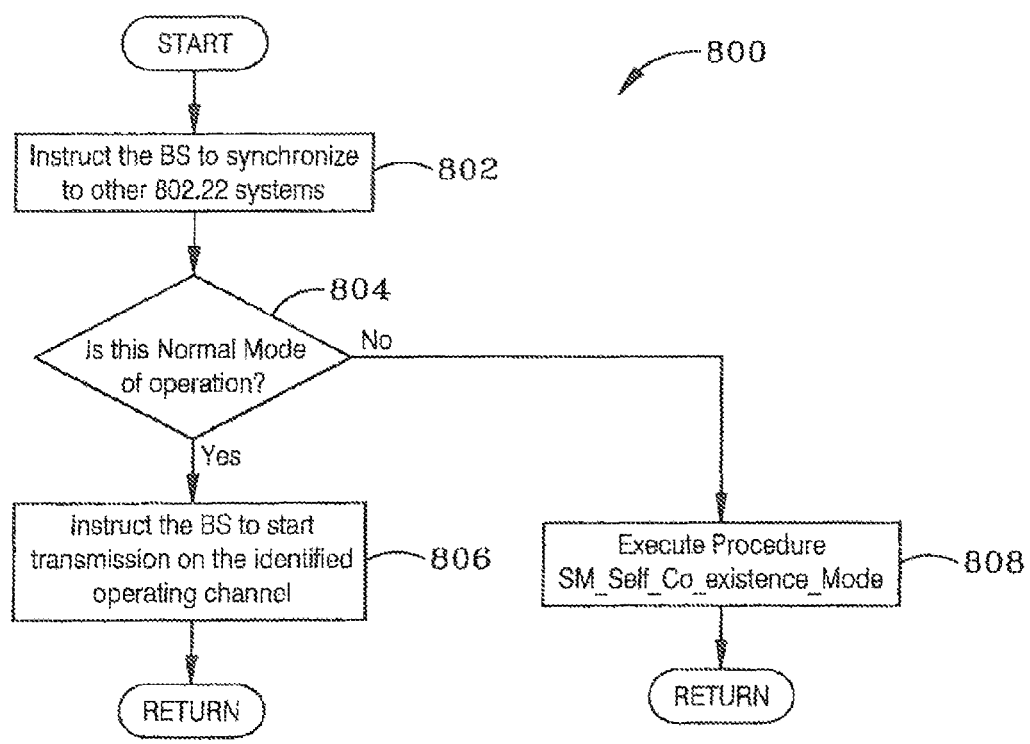
FIG. 8 illustrates one example embodiment of a flow diagram of procedure "SM_establish_network".

FIG. 8 illustrates a flow diagram of Procedure SM_Establish_Network 800. Initially, the SM instructs the BS to synchronize to other 802.22 systems, at 802. A determination is made if the normal mode of operation is available, at 804. If the normal mode of operation is available, the BS starts transmissions on the identified operating channel, at 806, and waits for CPEs to join the network. If the normal mode of operation is not available, the SM executes procedure SM_Self Co_Existance Mode, at 808. The CPE initialization operation, registration operation and procedure SM_Self_Co_Existance Mode are described in the sections 6.16.2, 6.16.2.10 and 6.22.3, respectively.

Figure 9B:
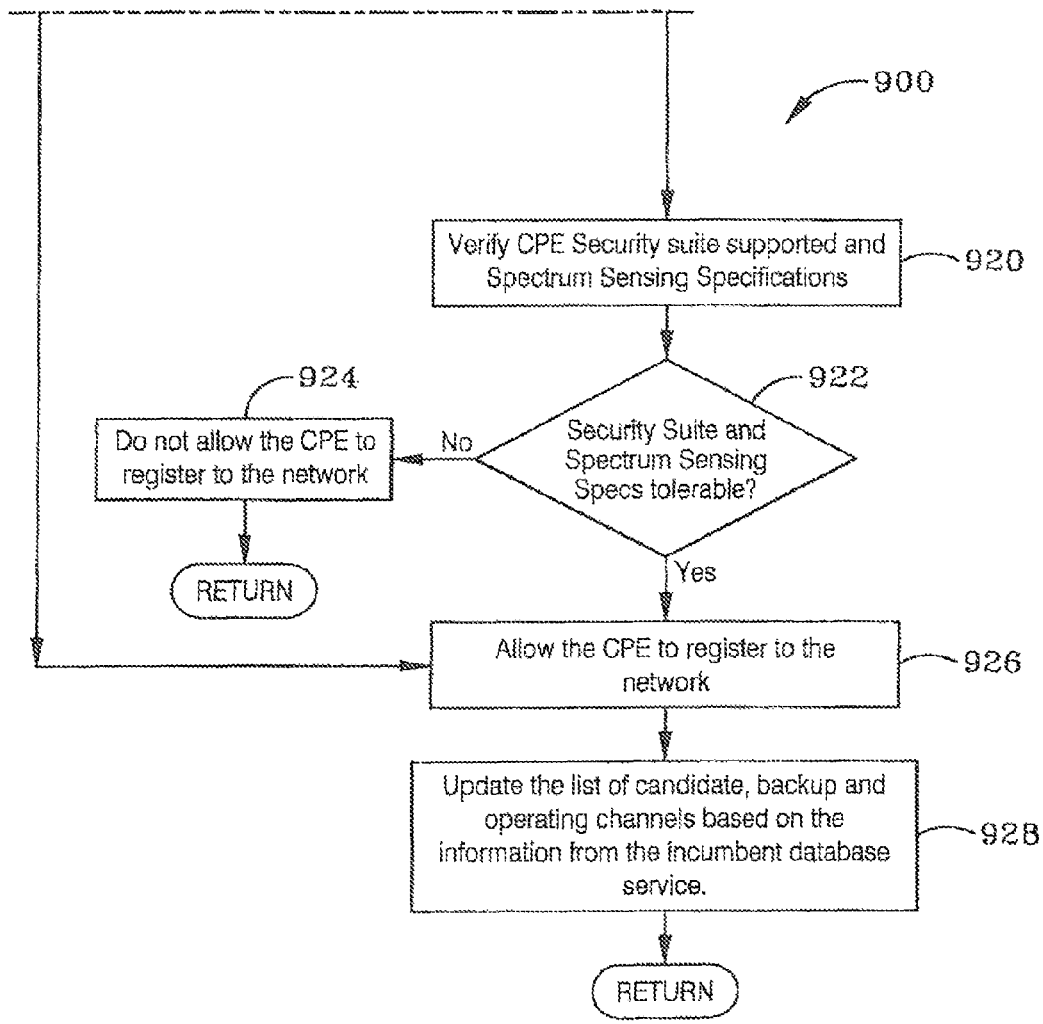

FIG. 9 illustrates a flow diagram 900 of the procedure SM_New_CPE_Verification. A new CPE that has not registered with the BS needs to make a registration request to the BS. The SM determines whether the CPE has registered with the BS, at 902. If it has, then the SM determines if the CPE location has changed, at 912. If the location has not changed, then the MS allows the CPE to register to the network, at 926, and the SM updates the list of candidates, backups and operating channels based on the information from the incumbent database service, at 928.

If the CPE has not registered before or the CPE location has changed, then the $T_{NoDB}$ timer is set, at 904. After the timer is set, the SM accesses the incumbent database service to verify if the current operating channel is available at the CPE location, at 906. Next the SM determines if the incumbent database service is found, at 908. If the incumbent database service is not found, then the SM re-accesses the incumbent database service again, at 905, if the $T_{NoDB}$ timer has not timed out. If the timer times out, then the SM executes a policy for that scenario, at 908. For example, one policy may require the SM to instruct the base station to de-register its associated CPEs and to terminate its own operation until the database service becomes available.

When an incumbent database service is found, the SM updates a location specific list of available channels from the database service, at 910, as well as resets the $T_{NoDB}$ timer. Next, the SM determines if the current operating channel is available at the CPE location, at 914. If it is not, the SM will execute policies defined for that situation, at 918. For example, if the channel is no longer available, then a channel switch can be initiated. Alternatively, if the channel is determined to soon to become unavailable, then the SM can initiate a move to a highest priority backup channel.

When the current channel is available at the CPE location, the SM verifies the security suite that the CPE supports and its spectrum sensing capabilities, at 920. The SM determines if the security suit and spectrum sensing is tolerable, at 922. If the SM finds that the current occupied channel is not available at the CPE location, or the CPE capabilities are less than required, it chooses to prevent the CPE from registering to the network, at 924. Otherwise, flow proceeds to block 926 where the CPE is allowed to register with the network.

Figure 10:
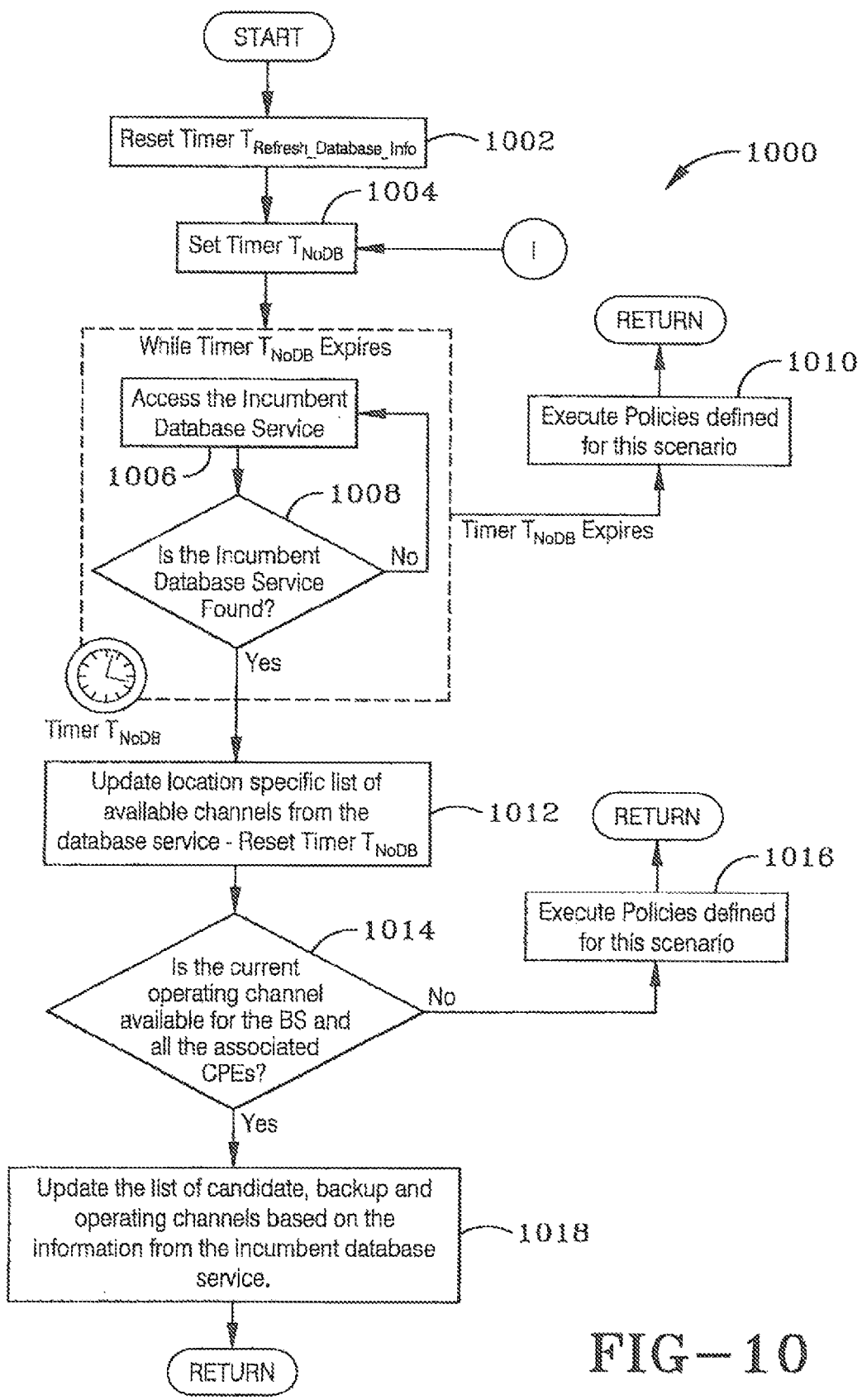
FIG. 10 illustrates one example embodiment of a flow diagram of procedure "SM_database_update".

FIG. 10 illustrates a flow diagram for procedure SM_Database_Update 1000. In the event that the timer $T_{Refresh\_Database\_Info}$ expires, the SM begins executing Procedure SM_Database_Update by resetting this timer, at 1002, and by setting timer $T_{NoDB}$, at 1004. After the timers are set, the SM accesses the incumbent database service, at 1006, to verify if the current operating channel is available at the CPE location. Next the SM determines if the incumbent database service is found, at 1008. If the incumbent database service is not found, then the SM re-accesses the incumbent database service again, at 1006, if the $T_{NoDB}$ timer has not timed out. If the timer times out, then the SM executes a policy for that scenario, at 1010. For example, the SM can instruct the base station to de-register its associated CPEs and to terminate its own operation until the database service becomes available.

When the incumbent database is found, the SM updates lists of available channels, at 1012, as well as resets the $T_{NoDB}$ timer. The SM verifies that the current operating channel is available for itself and all its CPEs, at 1014. If the current operating channel is available for the BS and all its associated CPEs, the BS continues operating on the existing operating channel and updates the list of candidates, backup and operating channels, at 1018, based on the information from the incumbent database service.

If the current operating channel is not available for the BS or one or more of its CPEs, the SM executes the appropriate policies, at 1016. For example, if the channel is no longer available, then a channel switch can be initiated. Alternatively, if the channel is determined to soon to become unavailable, then the SM can initiate a move to a highest priority backup channel.

Figure 11:
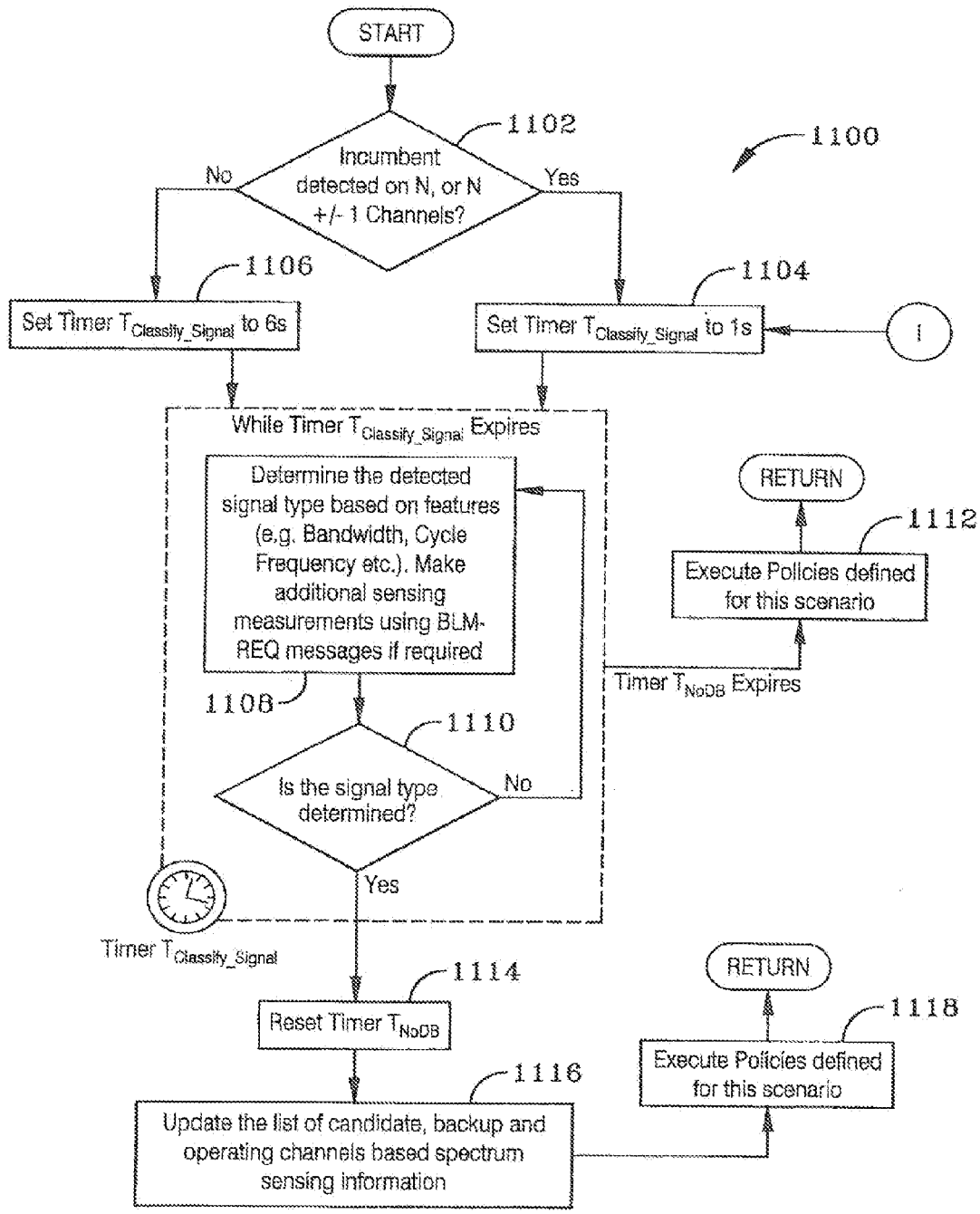
FIG. 11 illustrates one example embodiment of a flow diagram of procedure "Determine signal_type_execute_policies".

FIG. 11 illustrates the SM operation during the procedure Determine_Signal_Type_Execute_Policies 1100. The SM generally executes this procedure when it is notified that a signal is detected through the Spectrum Sensing Automaton of the BS or one or more of its CPEs.

If a signal is detected, then the SM shall attempt to find the type of the signal that has been detected. Based on the type of the signal, the SM shall execute policies as specified in the Spectrum Manager Policies in Section 9.2.5. The procedure 1100 begins by determining whether an incumbent was detected on the N, N+1 or N−1 channels, at 1102. If an incumbent is detected, then timer $T_{classify\_signal}$ is set to 1 second, at 1104, otherwise it is set to 6 seconds, at 1106.

Next, the SM tries to determine the detected signal type based on features such as bandwidth, cycle frequency and the like, at 1108, and can make additional sensing measurements that can use BLM-REQ messages. The SM determines if it has found the signal type, at 1110. When the signal type has not been determined, flow returns to block 1108 to continue to try to determine the signal type. When the $T_{NoBS}$ timer times out before the signal type is determined, the SM will execute policies to handle this situation. When the signal type is determined, the $T_{NoBS}$ timer is reset, at 1114. Additionally, the SM updates the list of candidate, backup and operating channels, at 1116, based on the spectrum sensing information as well as executes policies for this scenario, at 1118. For example, if the signal is a wireless microphone or TV signal, then information about the signal is logged and make and the signal is made available according to the local regulatory requirements.

Figure 12:
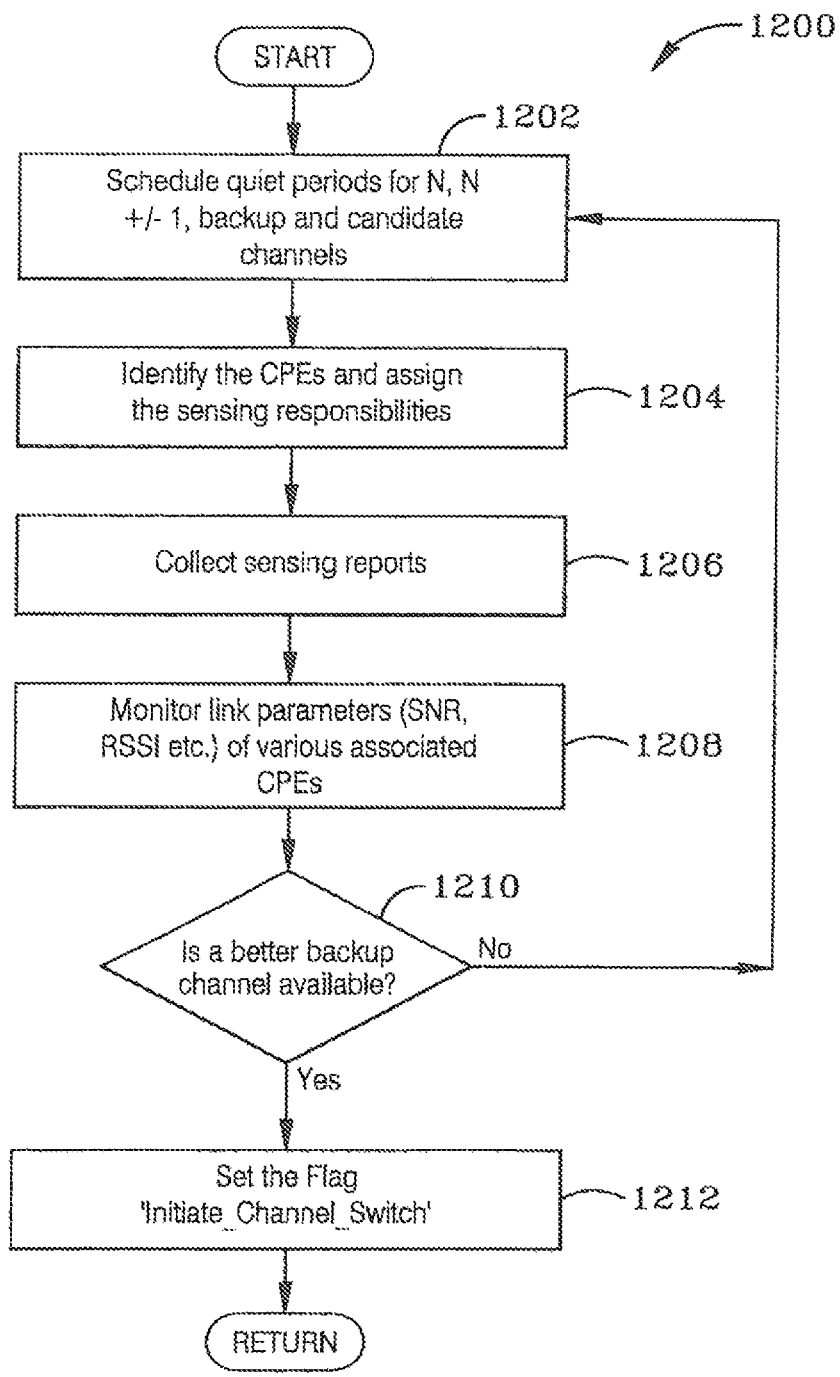
FIG. 12 illustrates one example embodiment of a flow diagram of procedure "SM_background_processes".

While the SM is idle, (no events are occurring), the SM may run the Procedure SM_Background_Processes 1200 that is illustrated in FIG. 12. In this procedure, the SM schedules quiet periods, at 1202. The quiet periods can be scheduled for N, N+1 and N−1, backup and candidate channels. The SM can identify CPEs and assign the sensing responsibilities, at 1204, to the corresponding SSAs at the CPEs (SSA operation during the idle time). The SM can collect the spectrum sensing reports, at 1206 (through BLM-REP). The SM can maintain the channel state information, monitor the link quality of various CPEs, monitor link parameters, at 1208 such as SNR, RSSI and the like. Based, at least in part, on this information, the SM can determine if a better backup channel is available, at 1210. If a better backup channel is determined, then the SM can initial a channel switch, 1212, otherwise flow can return to block 1202.

FIGS. 13-22 illustrate other embodiments of previously discussed procedures and additional procedures.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is ah example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method of operating a spectrum manager (SM) in a cognitive radio network comprising:
    operating the spectrum manager in a network initialization state while determining if an operating channel is found;
    moving the spectrum manager to a network operation state when an operating channel is found; and
    moving the spectrum manager to the network initialization state when a channel move is required as a result of a backup channel being found with a higher data rate than the operating channel.

2. The method of operating a spectrum manager of claim 1 further comprising one or more of the group of:
    the SM interfaces accesses an incumbent database service;
    the SM applies regulatory domain specific policies:
    the SM performs channel set management;
    the SM initiates channel move or spectrum mobility;
    the SM performs incumbent protection;
    the SM initiates a self co-existence mode;
    the SM performs resource allocation;
    the SM interfaces with a Network Management System
    the SM interfaces with a Co-existence Manager and
    the SM monitors and schedules quiet periods.

3. The method of operating a spectrum manager of claim 1 further comprising:
    while in the network initialization state, determining if an operating channel is available;
    when several operating channels are available, using spectrum sensing etiquette to choose an operating channel; and
    establishing a network in a normal mode of operation.

4. The method of operating a spectrum manager of claim 3 further comprising:
    updating a list of candidate channels, operating channels and backup channels.

5. The method of operating a spectrum manager of claim 1 further comprising:
    when an operating channel is found, determining if one or more exclusive backup channels are found;
    when an exclusive backup channel is not found, determining if the network may operate in a self co-existence mode; and
    placing the cognitive radio network into a self co-existence mode when an exclusive backup channel is not found and there are other cognitive radio network that wish to operate on the same channel.

6. The method of operating a spectrum manager of claim 1 further comprising:
    accessing an incumbent database service to find a list of available channels determining if an incumbent database service is found;
    providing geo-location estimates of the subscribers along with information including one or more of the group of: transmit antenna height and power to the incumbent database service;
    receiving a list of available channels from the incumbent database service; and
    choosing an operating channel from the list of available channels provided by an incumbent database service.

7. The method of operating a spectrum manager of claim 1 further comprising:
    setting a timer before the accessing an incumbent database service; and
    abiding by the regulatory domain policies in case the incumbent database service cannot be found before the timer expires.

8. The method of operating a spectrum manager of claim 7 further comprising:
    when the timer expires, instructing a base station to de-register subscribers associated with the base station and to terminate its own operation until a database service becomes available.

9. The method of operating a spectrum manager of claim 7 further comprising:
    updating a list of available channels from the incumbent database service; and
    resetting the timer.

10. The method of operating a spectrum manager of claim 1 further comprising:
  determining if an incumbent database service is found; and
  when if an incumbent database service is found, performing at least one or more of the group of: providing the incumbent database service locations of various subscribers with the height of their transmit and receive antennas and with transmit power, updating a list of available channels from the incumbent database service, discovering neighboring cognitive radio systems, discovering schedules of neighboring cognitive radio system quiet periods, scheduling quiet periods for connected spectrum sensing automatons, instructing connected spectrum sensing automatons to move into an initialization state and to find a list of candidate channels that are a subset of available channels, and spectrum sensing to convert a candidate to a new backup channel.

11. The method of operating a spectrum manager of claim 1 further comprising:
  while in the network initialization state, determining if an operating channel is available;
  when an operating channel is not available, determining if an incumbent database service can be found;
  when an incumbent database service is found, determining if one or more exclusive backup channels are found;
  when one or more exclusive backup channels are found, using spectrum sensing etiquette to choose an operating channel; and
  establishing the cognitive radio network in a normal mode of operation.

12. The method of operating a spectrum manager of claim 1 further comprising:
  when an operating channel is available, instructing a base station to synchronize to other cognitive radio networks;
  determining if the operating channel is available for normal mode of operation;
  instructing the base station to start transmission on the operating channel when the operating channel is available for normal mode of operation; and
  instructing the base station to operate in a self co-existence mode when the operating channel is not available.

13. The method of operating the spectrum manager of claim 1 further comprising:
  determining if a consumer premise equipment (CPE) has registered with a base station (BS) associated with the spectrum manager before;
  when the CPE has registered with the BS, determining if a location of the CPE has changed; and
  when the location has not changed, allowing the CPE to register with the cognitive radio network.

14. The method of operating a spectrum manager of claim 13 further comprising:
  when the CPE has registered with the BS or the location of the CPE has changed, determining if an incumbent database service is found;
  when an incumbent database service is found, update a location specific list of available channels from the database service;
  when an incumbent database service is found, verify CPE security suite supported and CPE spectrum sensing specifications;
  determine of the CPE security suite and the CPE spectrum sensing specifications are supported by the cognitive wireless network; and
  when the CPE security suite and the CPE spectrum sensing specifications are supported, allowing the CPE to register with the cognitive wireless network.

15. The method of operating a spectrum manager of claim 14 further comprising:
  when the CPE security suite and the CPE spectrum sensing specifications are not supported, not allowing the CPE to register with the cognitive wireless network; and
  when the CPE security suite and the CPE spectrum sensing specifications are not supported, updating a list of candidate channels, backup channels and operating channels based on the incumbent database service.

16. The method of operating a spectrum manager of claim 1 further comprising:
  detecting a refresh database timer has expired;
  when the refresh database timer has expired:
  resetting the refresh database timer;
  accessing an incumbent database service;
  determining if an incumbent database service is found; and
  when an incumbent database service is found, updating a location specific list of available channels from the incumbent database service.

17. The method of operating a spectrum manager of claim 16 further comprising:
  when the refresh database timer has expired:
  determining if the operating channel is available for a base station associated with the spectrum manager and associated GPEs; and
  when the operating channel is available for a base station associated with the spectrum manager and associated CPEs, updating a list of candidate channels, backup channels and operating channels based on the incumbent database service.

18. The method of operating a spectrum manager of claim 1 further comprising:
  detecting an incumbent signal;
  determining if a signal type of the incumbent signal can be determined;
  when the signal type can be determined, determining the signal type; and
  execute 802.22 policies based, at least in part, on the signal type.

19. The method of operating a spectrum manager of claim 18 wherein the detecting an incumbent signal further comprises:
  detecting an incumbent signal on the N channel, N−1 channel or the N+1 channel;
  setting timer $T_{classify\_signal}$ to a first threshold value when no incumbent signal is detected;
  setting timer $T_{classify\_signal}$ to a second threshold value when an incumbent signal is detected, where the second threshold value is smaller than the first threshold value;
  wherein determining the signal type further comprises:
  determining the signal type while timer $T_{classify\_signal}$ has not expired; and
  when timer $T_{classify\_signal}$ times out, executing cognitive radio policies associated with the $T_{classify\_signal}$ timing out.

20. The method of operating a spectrum manager of claim 1 wherein the moving the spectrum manager to the network initialization state when a backup channel with a higher signal to noise ratio (SNR) than the operating channel is found further comprises:
  while in the network operation state and in an idle state when there are no events occurring, determining if a better backup channel is available; and
  initiating a channel switch when a better backup channel is available.

21. The method of operating a spectrum manager of claim 20 further comprising:

scheduling quiet periods for N, N−1 and N+1 backup and candidate channels;

identifying CPEs and assign sensing responsibilities;

collecting sensing reports;

monitoring at least one link parameter of the identified CPEs including parameters from the group consisting of: signal to noise ratio (SNR) and received signal strength indication (RSSI); and wherein the determining if a better backup channel is available is base, at least in part on one or more of the sensing reports, the SNRs and the RSSIs.

\* \* \* \* \*